INVENTORS
DEMETRIUS G. JELATIS
ROBERT A. OLSEN
LESTER W. HAAKER
By Moore, White & Burd
ATTORNEYS

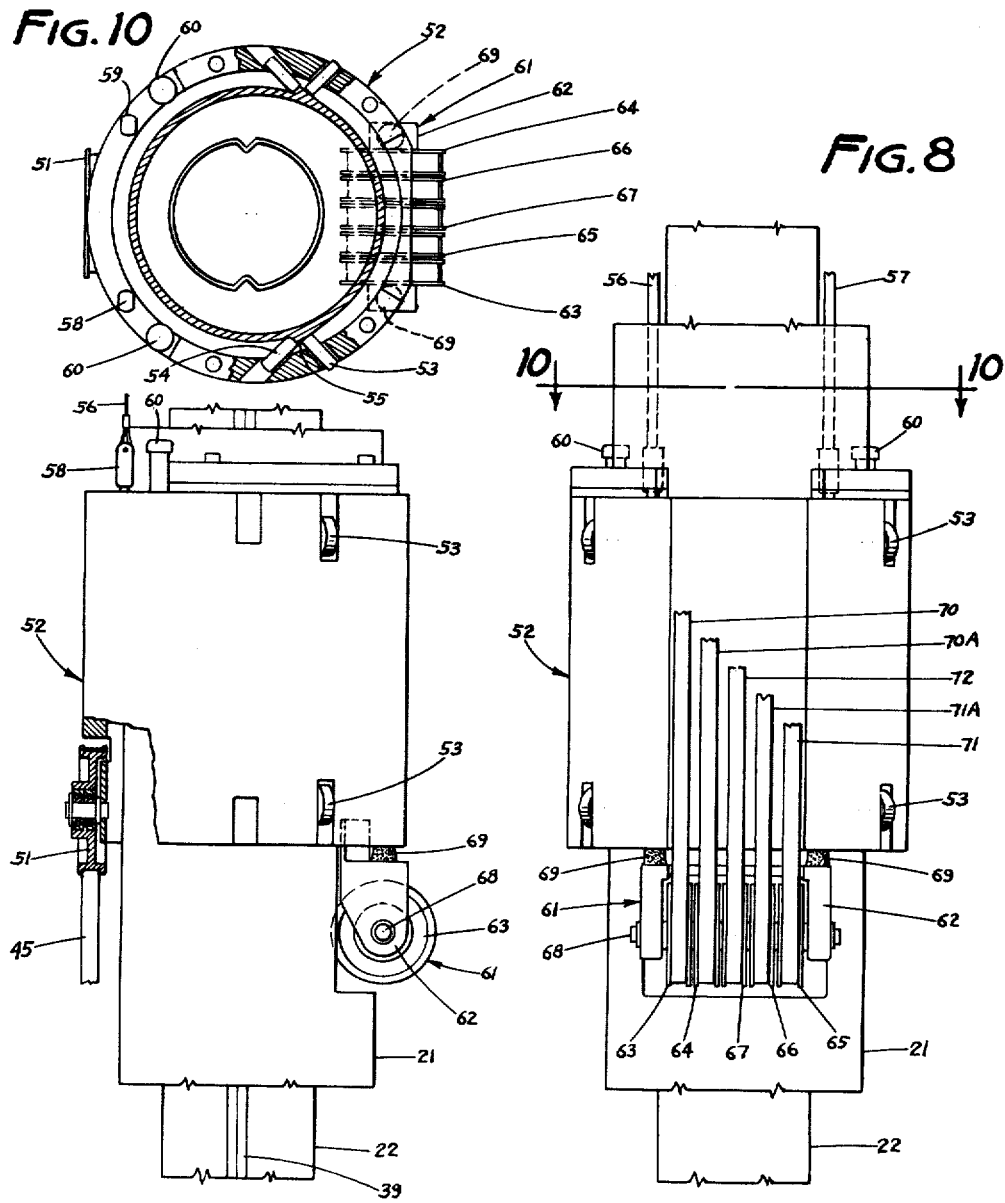

INVENTORS
DEMETRIUS G. JELATIS
ROBERT A. OLSEN
LESTER W. HAAKER

By Moore, White & David
ATTORNEYS

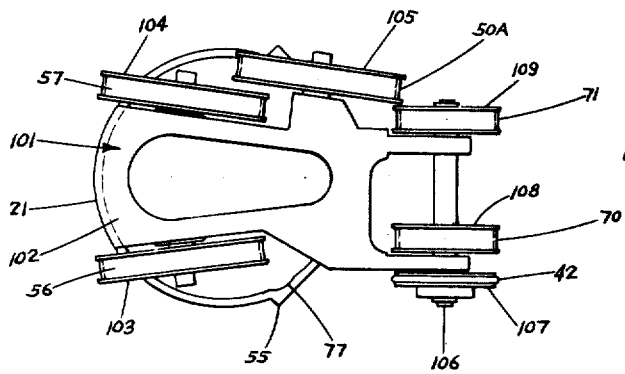
FIG. 15
FIG. 12
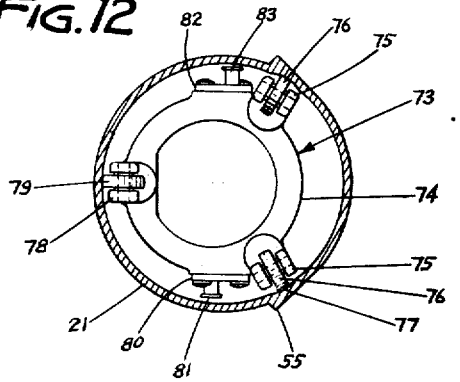
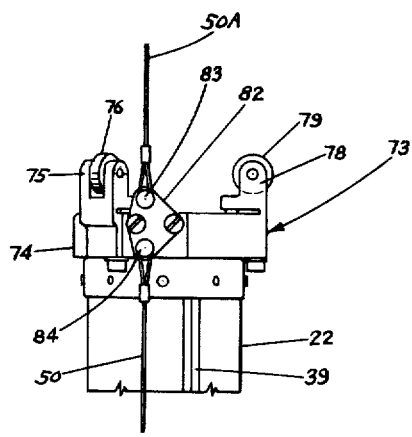
FIG. 13
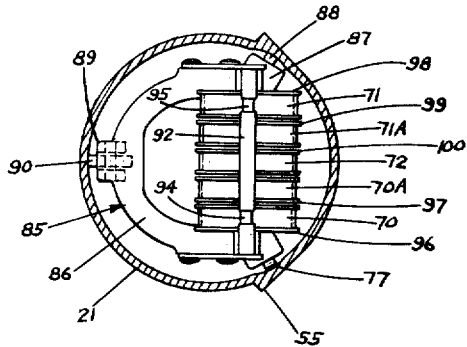
FIG. 14
INVENTORS
DEMETRIUS G. JELATIS
ROBERT A. OLSEN
LESTER W. HAAKER
By Moore, Whicher Reed
ATTORNEYS

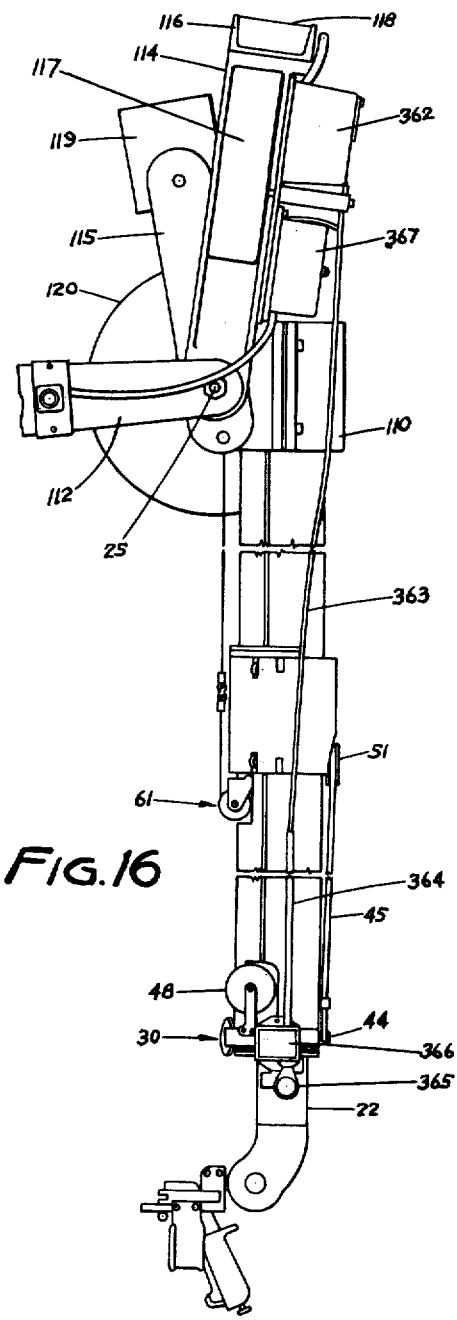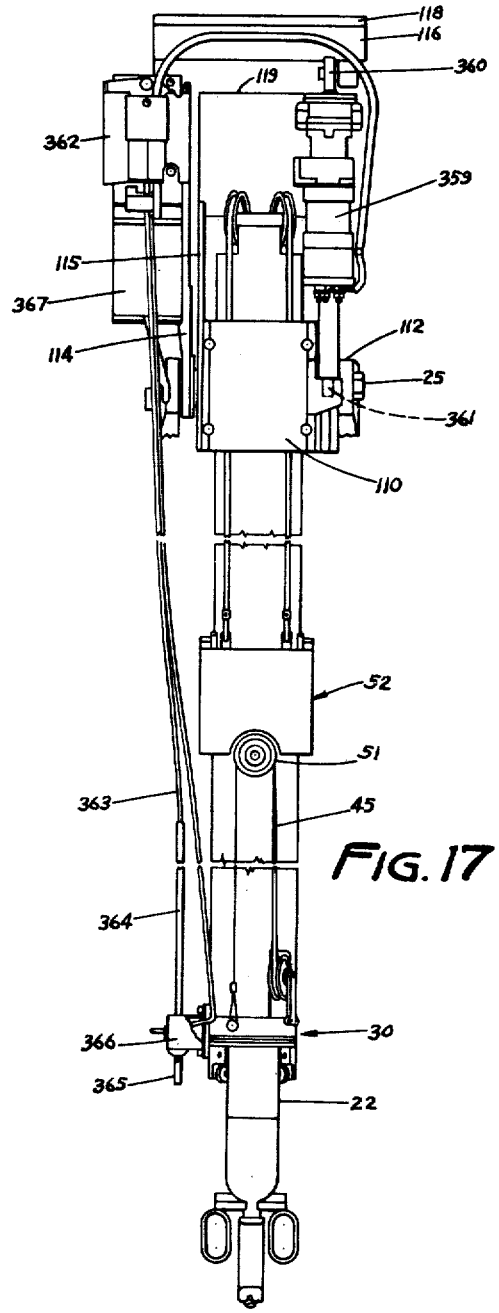

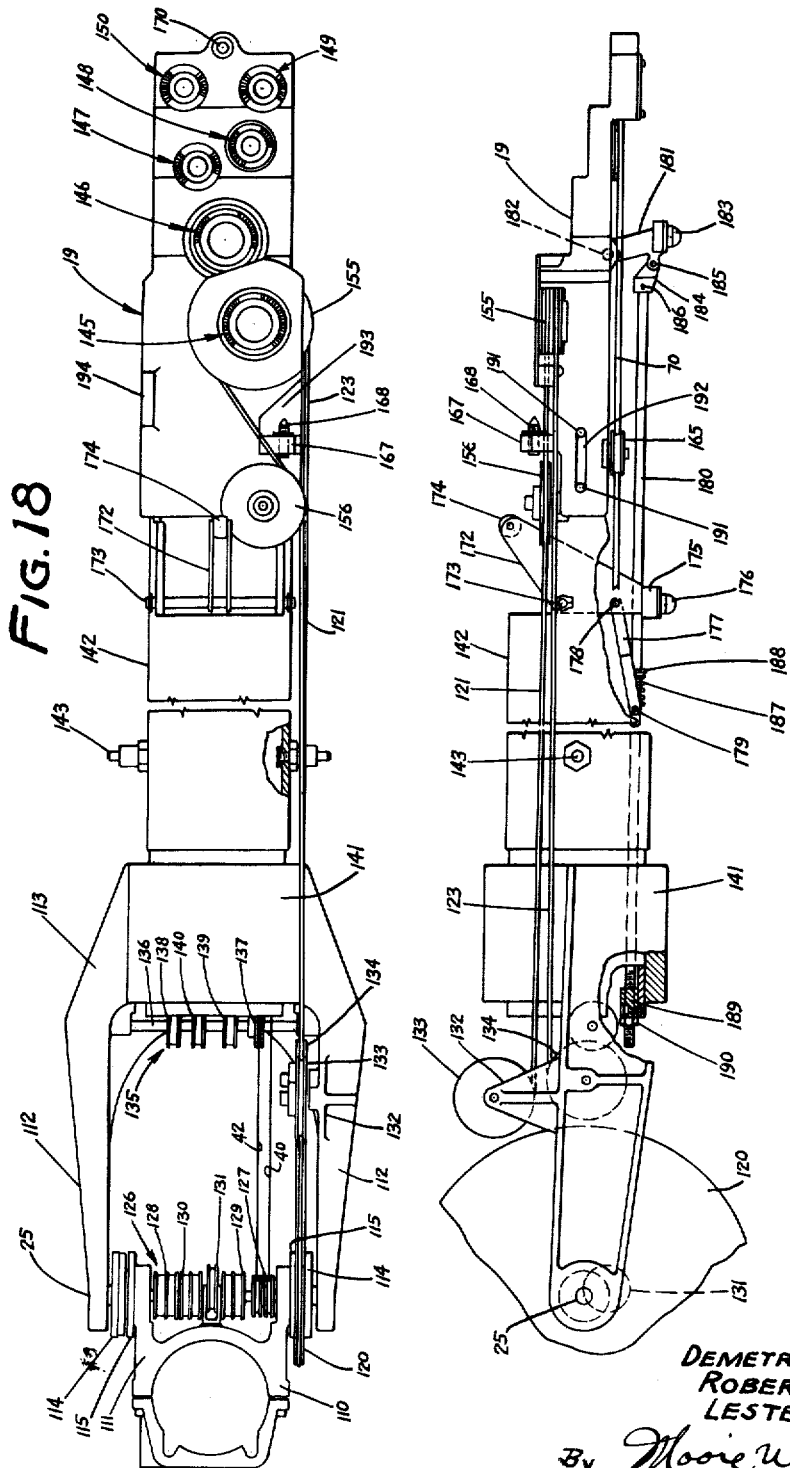

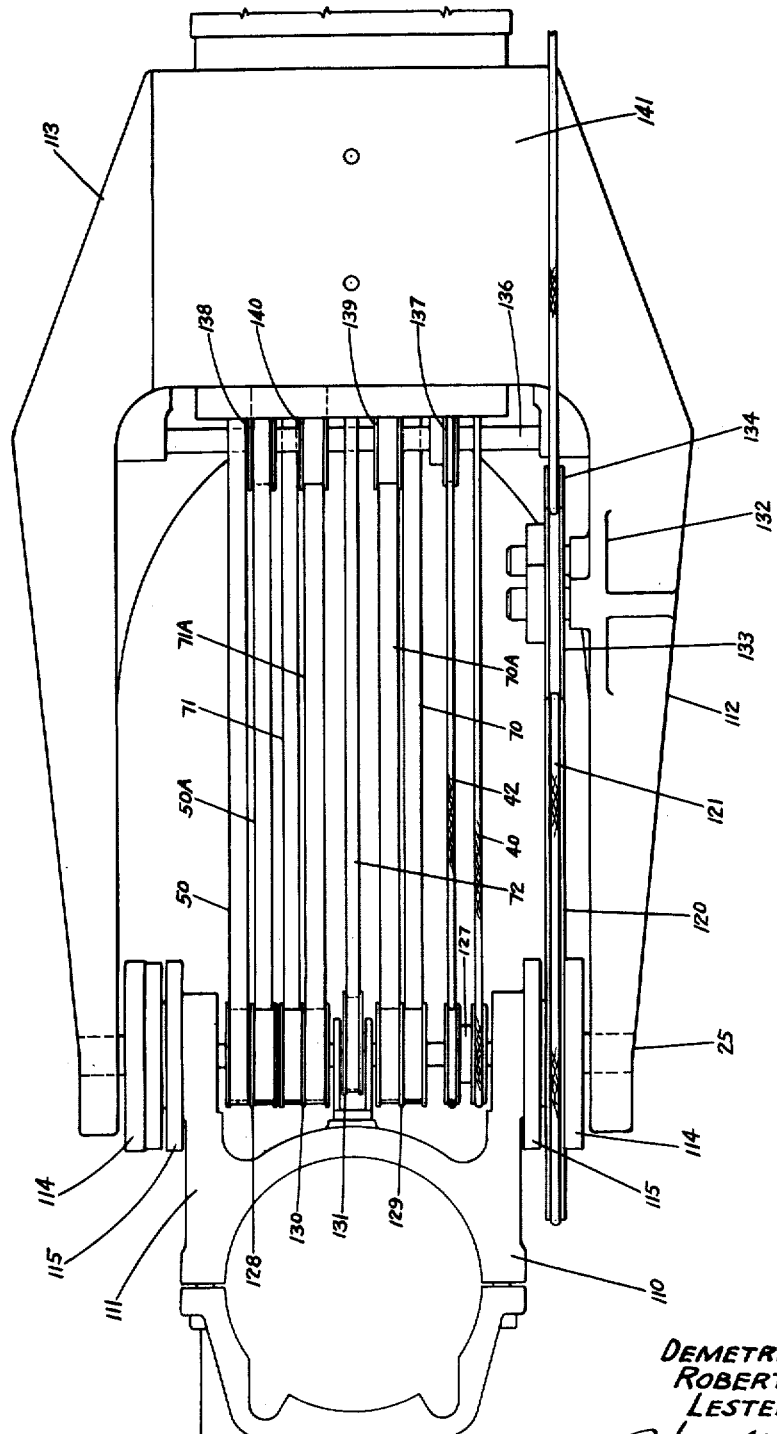
INVENTORS
DEMETRIUS G. JELATIS
ROBERT A. OLSEN
LESTER W. HAAKER
By Moore, White & Burd
ATTORNEYS

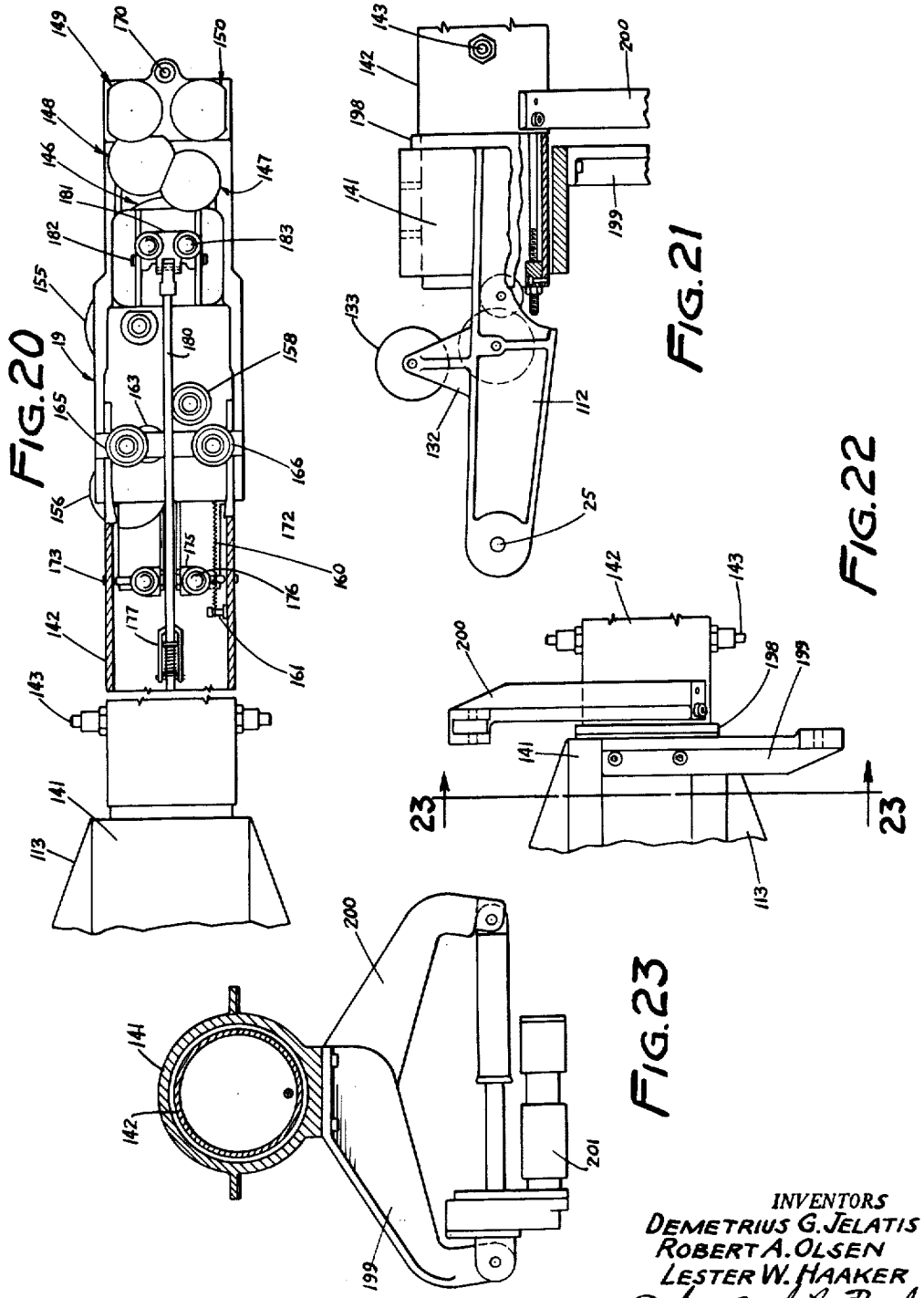

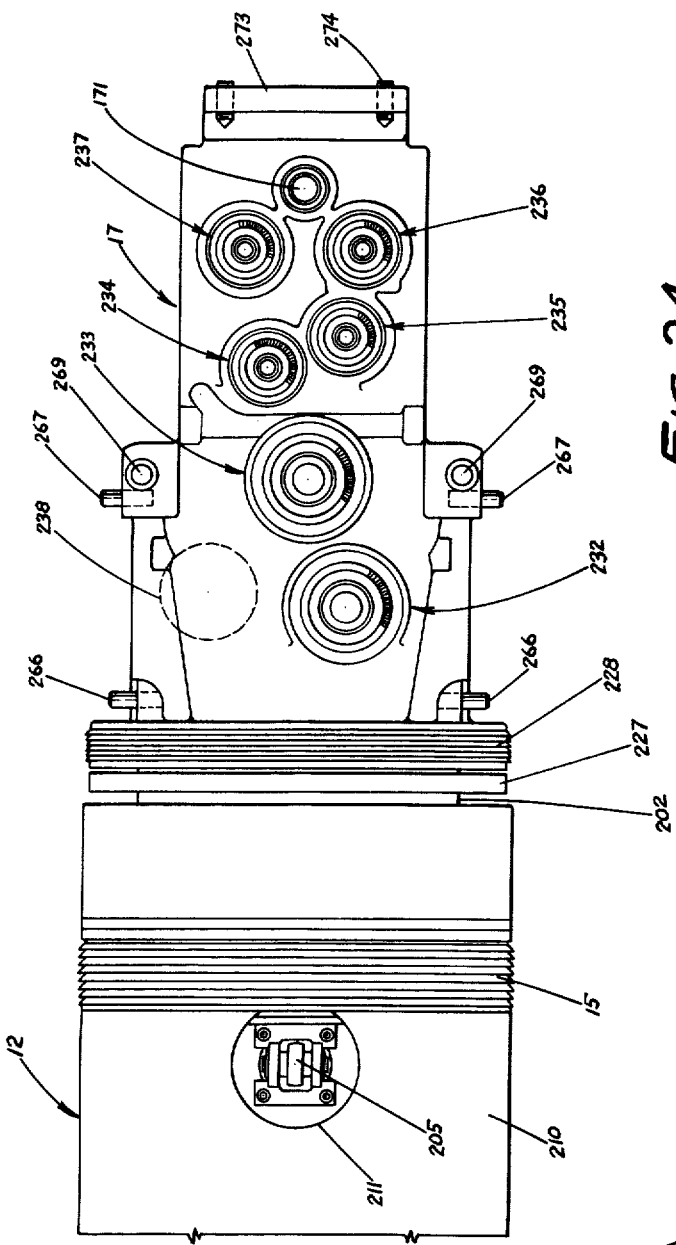

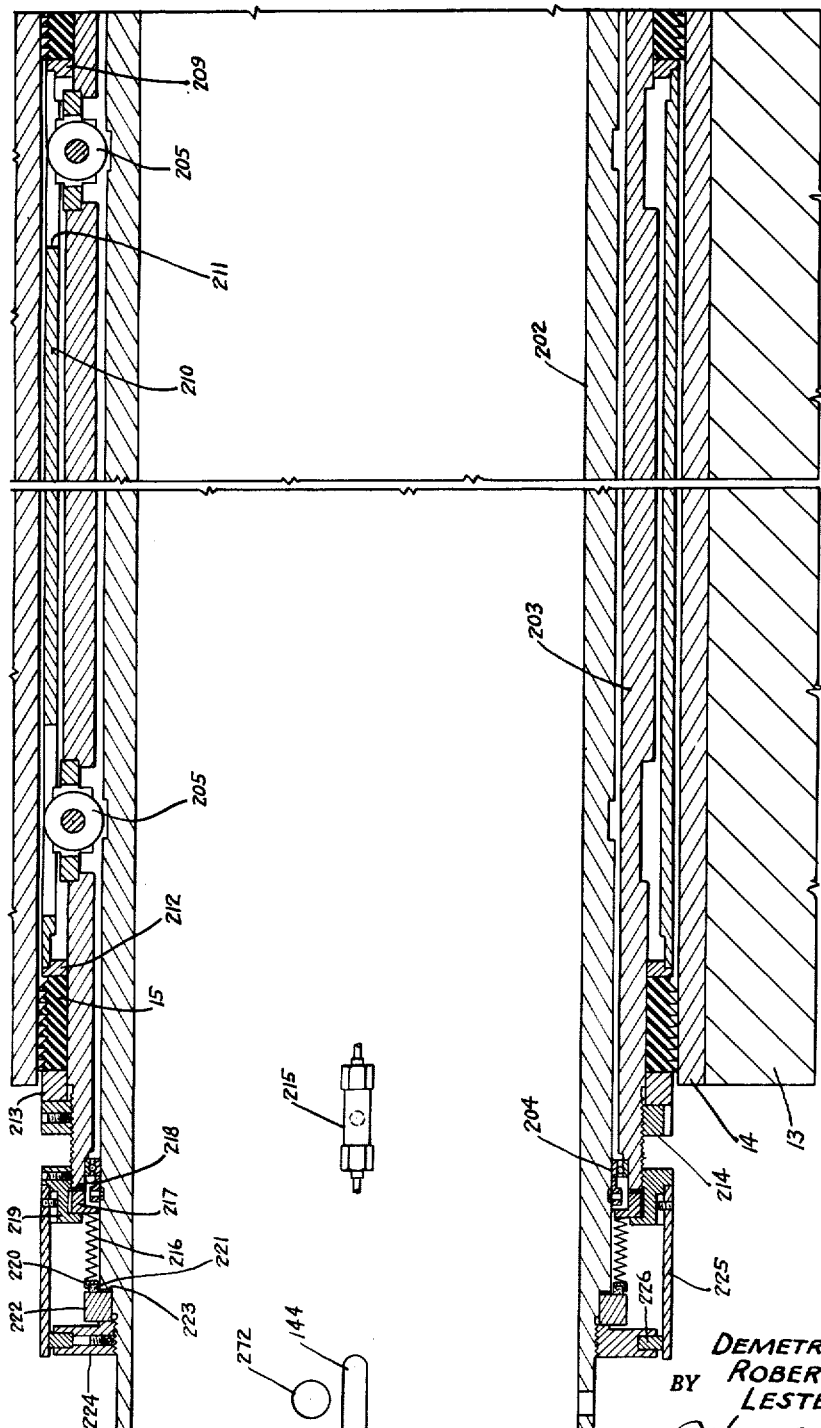

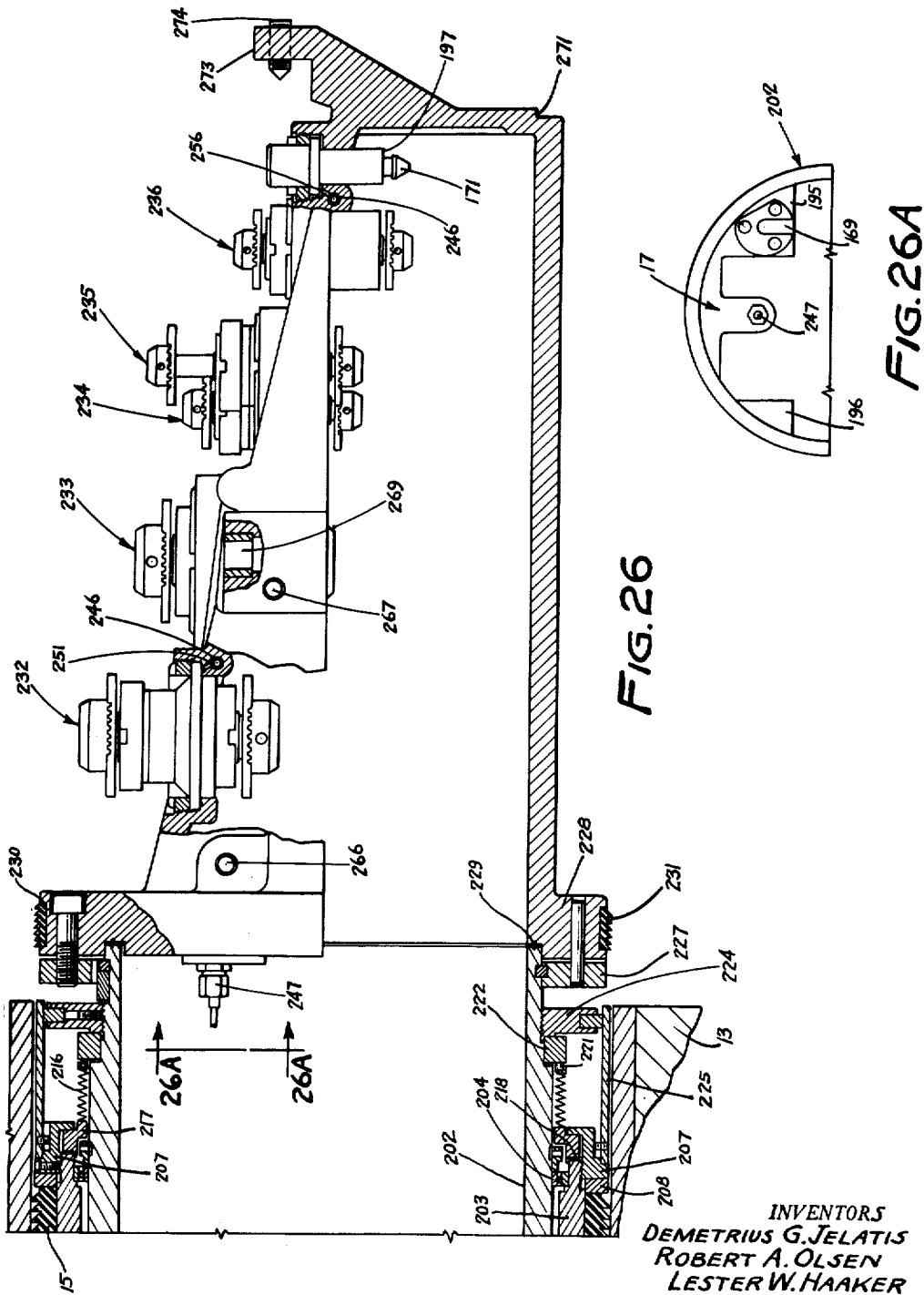

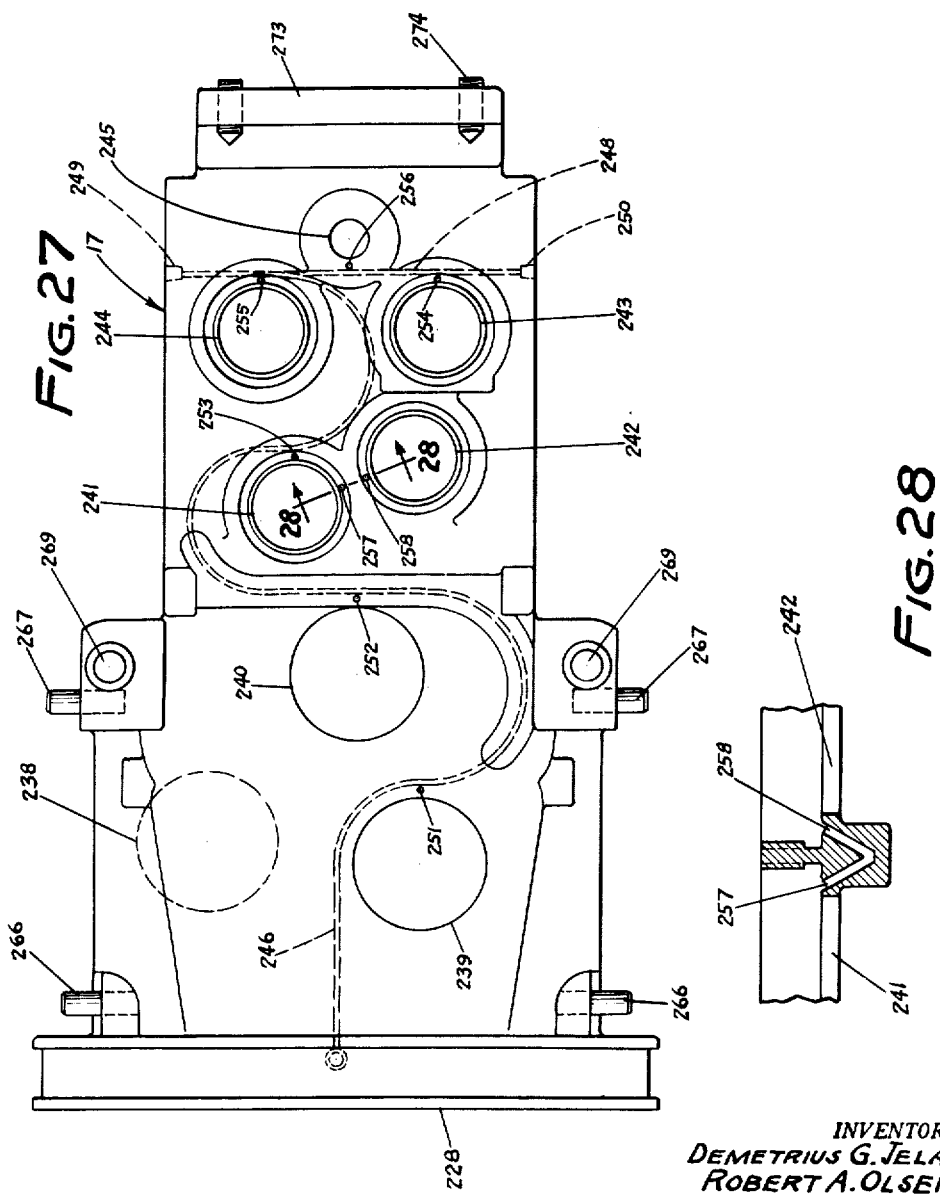

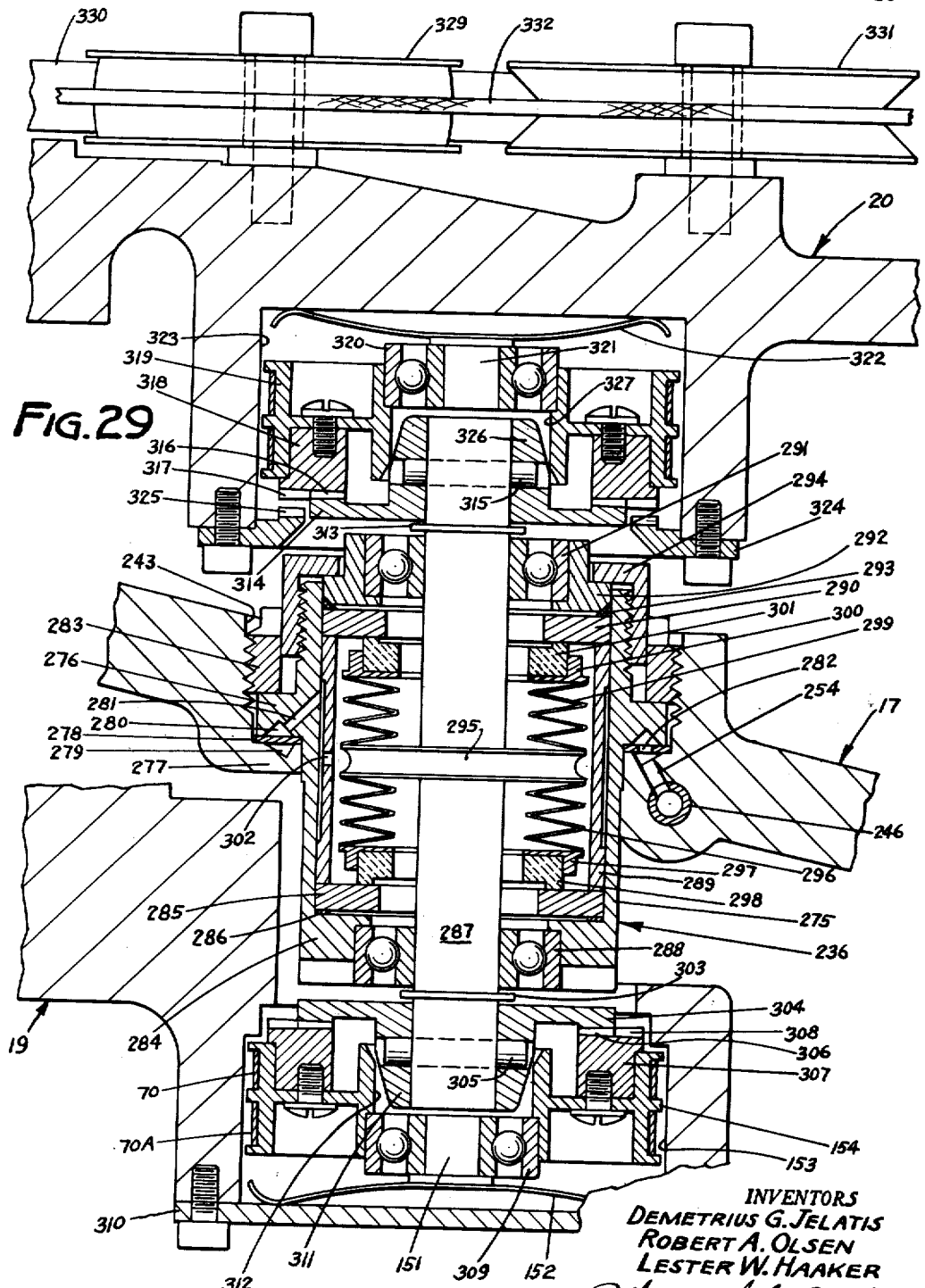

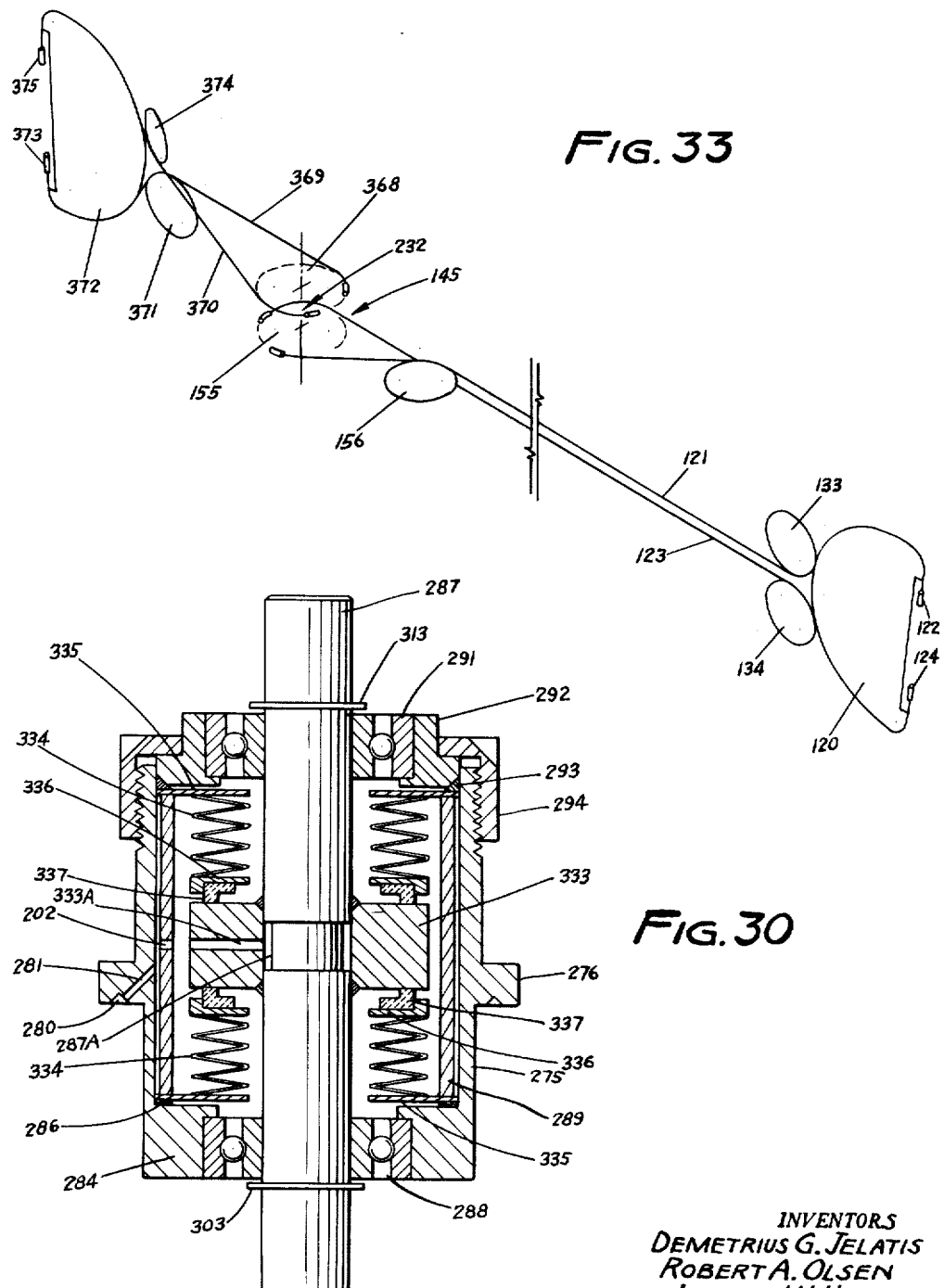

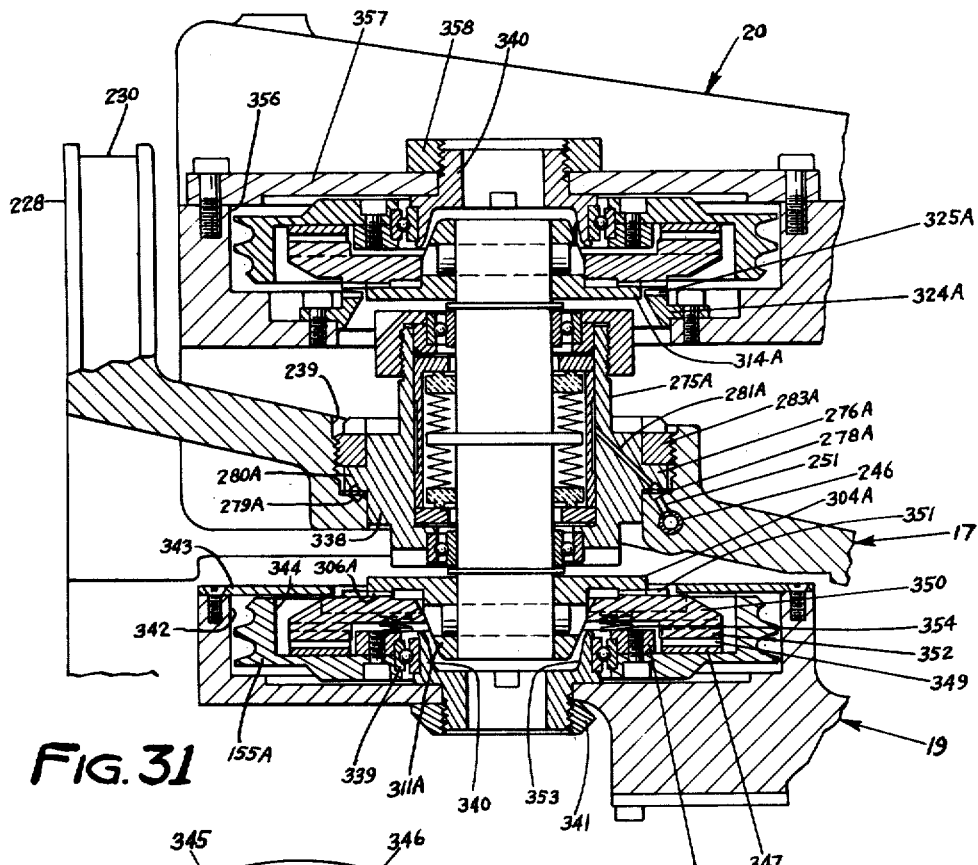
FIG. 31
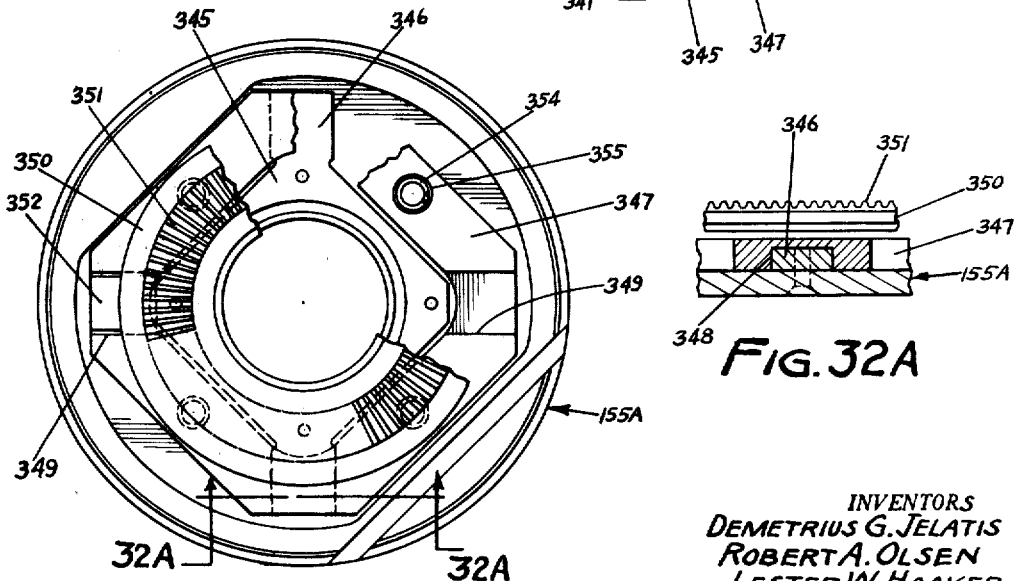
FIG. 32
FIG. 32A
INVENTORS
DEMETRIUS G. JELATIS
ROBERT A. OLSEN
LESTER W. HAAKER
By Moore, White & Burd
ATTORNEYS

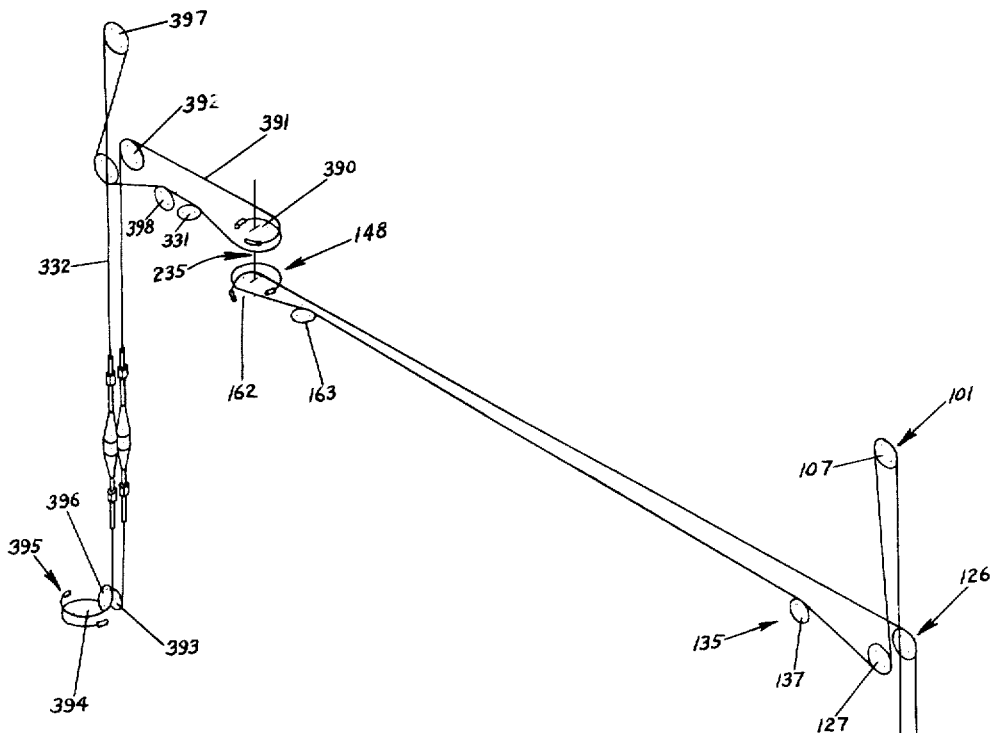
FIG. 37
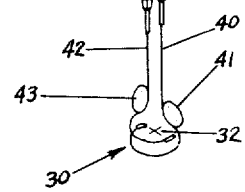

United States Patent Office 3,164,267
Patented Jan. 5, 1965

3,164,267
SEALED MASTER-SLAVE MANIPULATOR
Demetrius G. Jelatis, Robert A. Olsen, and Lester W. Haaker, all of Red Wing, Minn., assignors to Central Research Laboratories, Inc., Red Wing, Minn., a corporation of Minnesota
Filed Mar. 27, 1961, Ser. No. 98,372
25 Claims. (Cl. 214—1)

This invention relates to remote control manipulators of the type by which movements of a handle engaged by an operator are reproduced in a claw or grasper engaging an article to be manipulated and spaced from the operator on the opposite side of a protective barrier wall. More particularly, the present invention relates to a sealed master-slave remote control manipulator adapted to function between differing environments separated by a tight sealed protective barrier.

INTRODUCTION

The sealed manipulator of the present invention is adapted for use, for example, in high level alpha-gamma hot cells, in cells requiring complete atmosphere control for handling pyrophoric or otherwise atmosphere sensitive materials, in cells handling highly toxic gaseous or air borne particulate materials under circumstances involving risk of dissemination by explosion or other accident, or similar installations where it is desirable or imperative that the operator be in an environment completely sealed from the environment in which the slave arm of the manipulator functions.

Other applications of the remote control manipulator according to the present invention include use in submerged vessels such as bathyspheres and bathyscaphes wherein the operator within the vessel can operate the slave arm of the manipulator in the water outside; in manned satellites and space stations and the like wherein the operator inside the vessel can manipulate the slave arm in the vacuum of outer space; in conditions wherein the slave arm is used to perform functions in an environment of much higher or much lower humidity than that of the operator; in cells handling biologically dangerous materials; and other related applications.

The sealed master-slave remote control manipulator according to the present invention functions to provide sensitive mechanical master-slave manipulation with reasonable load handling capacity through a barrier under conditions demanding ultimate separation of the operator from the environment in which the slave arm performs. This result is accomplished by the conversion of all manipulator motions to pure rotary motions which are transmitted from the master arm mechanism to the slave arm mechanism through double rotary mechanical seals between them. The manipulator is divided into three separate standardized subassemblies. These are the master arm, the slave arm and the seal tube assemblies. The seal tube assembly is mounted in a horizontal tube in the protective barrier and is statically sealed therein. Both the rotary mechanical seals between the master and slave mechanisms, and the seal tube assembly, may be pressurized with gas to serve as a lock permitting continuous monitoring of seal integrity. In the event of seal failure any resulting leak will only allow the innocuous pressurizing gas to escape into either the master or slave compartment while avoiding likelihood of transfer of hazardous material.

THE DRAWINGS

The sealed manipulator according to the present invention is illustrated in the accompanying drawings in which like numerals refer to corresponding parts and in which:

FIGURE 8 is a fragmentary back or rear elevation on an enlarged scale of the intermediate portion of the master arm trunk tube showing the counterweight associated with up and down movement of the boom tubes of the arms, and the trunk tube pulley bank assembly;

FIGURE 9 is a fragmentary right side elevation on an enlarged scale, shown partly broken away, of the same intermediate portion of the master arm trunk tube;

FIGURE 10 is a section, on the line 10—10 of FIGURE 8 and in the direction of the arrows, showing details of the counterweight and associated structure;

FIGURE 12 is a transverse section, generally on the line 12—12 of FIGURE 11 and in the direction of the arrows, showing the full speed carriage assembly at the top of the master arm boom tube;

FIGURE 13 is a left side elevaiton of the top end of the master arm boom tube showing the full speed carriage assembly;

FIGURE 14 is a transverse section, generally on the line 14—14 of FIGURE 11 and in the direction of the arrows, showing the half speed carriage assembly above the top of the master arm boom tube;

FIGURE 15 is a top plan of the upper pulley bank at the top end of the master arm trunk tube, generally on the line 15—15 of FIGURE 11 and in the direction of the arrows;

FIGURE 16 is a left side elevation of the assembled master arm, foreshortened by breaking away portions of the arm;

FIGURE 17 is a corresponding front elevation of the assembled master arm;

FIGURE 18 is a top plan, partly broken away, of the master arm rotary motion transfer assembly which extends into the seal tube support;

FIGURE 18A is a fragmentary top plan on an enlarged scale of the pivot bracket in which the master arm is supported;

FIGURE 19 is a right side elevation, partly broken away and partly in section, of the master arm transfer assembly;

FIGURE 20 is a fragmentary bottom plan view of the master arm transfer assembly;

FIGURE 21 is a fragmentary right side elevation of a slightly modified form of master arm transfer assembly, shown partly broken away and adapted to impart lateral movement to one of the arm assemblies relative to the other.

FIGURE 22 is a fragmentary top plan of the modified structure adapted for lateral rotation:

FIGURE 23 is a fragmentary transverse section through the master transfer assembly modified for lateral rotation;

FIGURE 24 is a top plan view of the slave arm end of the seal tube including a rotary motion transfer plate;

Figure 34:
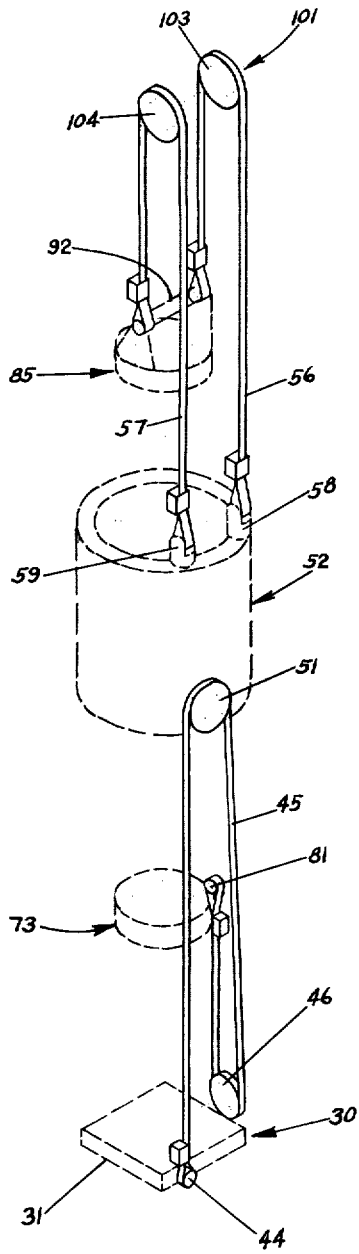
Figure 35:
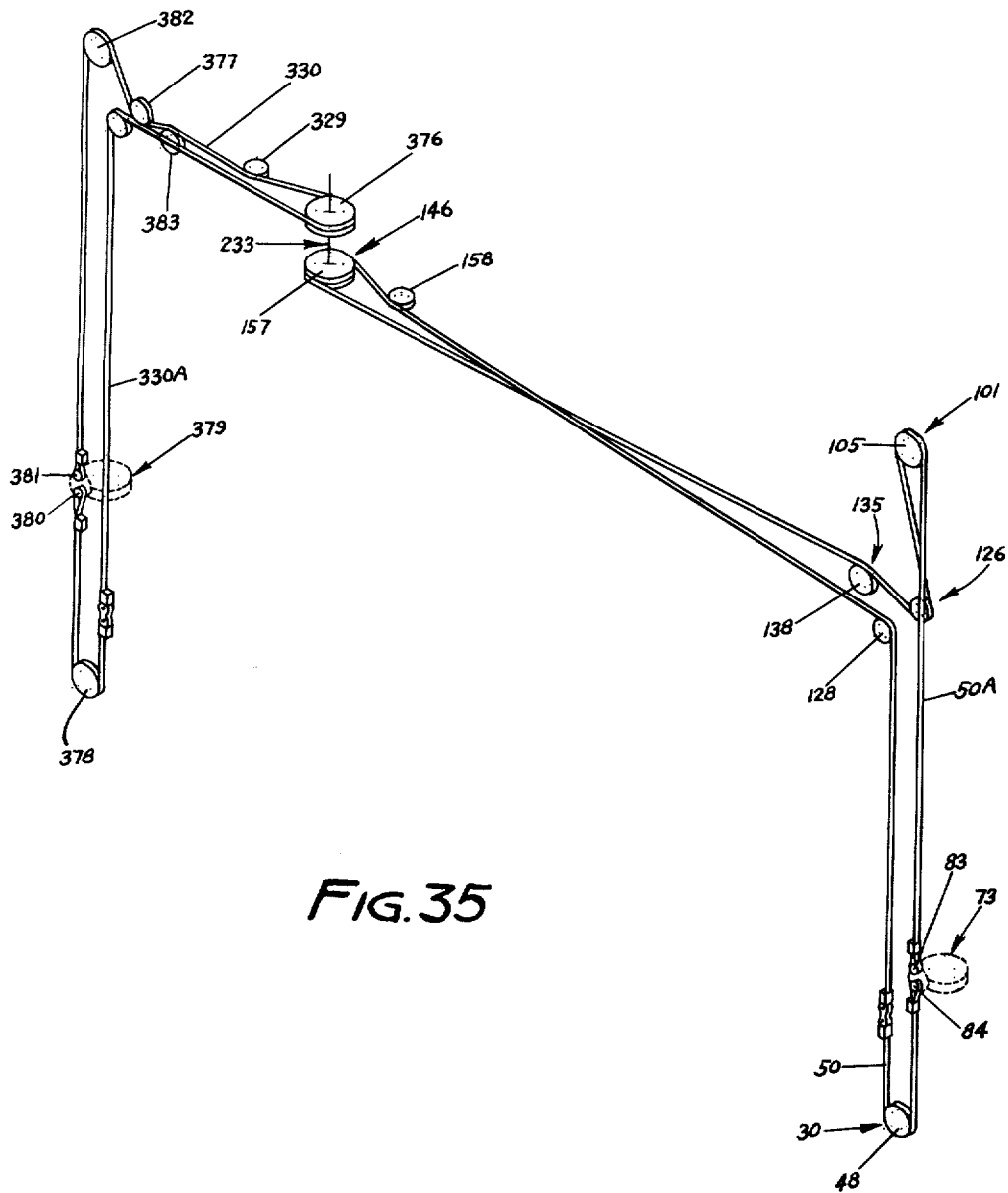
Figure 36:
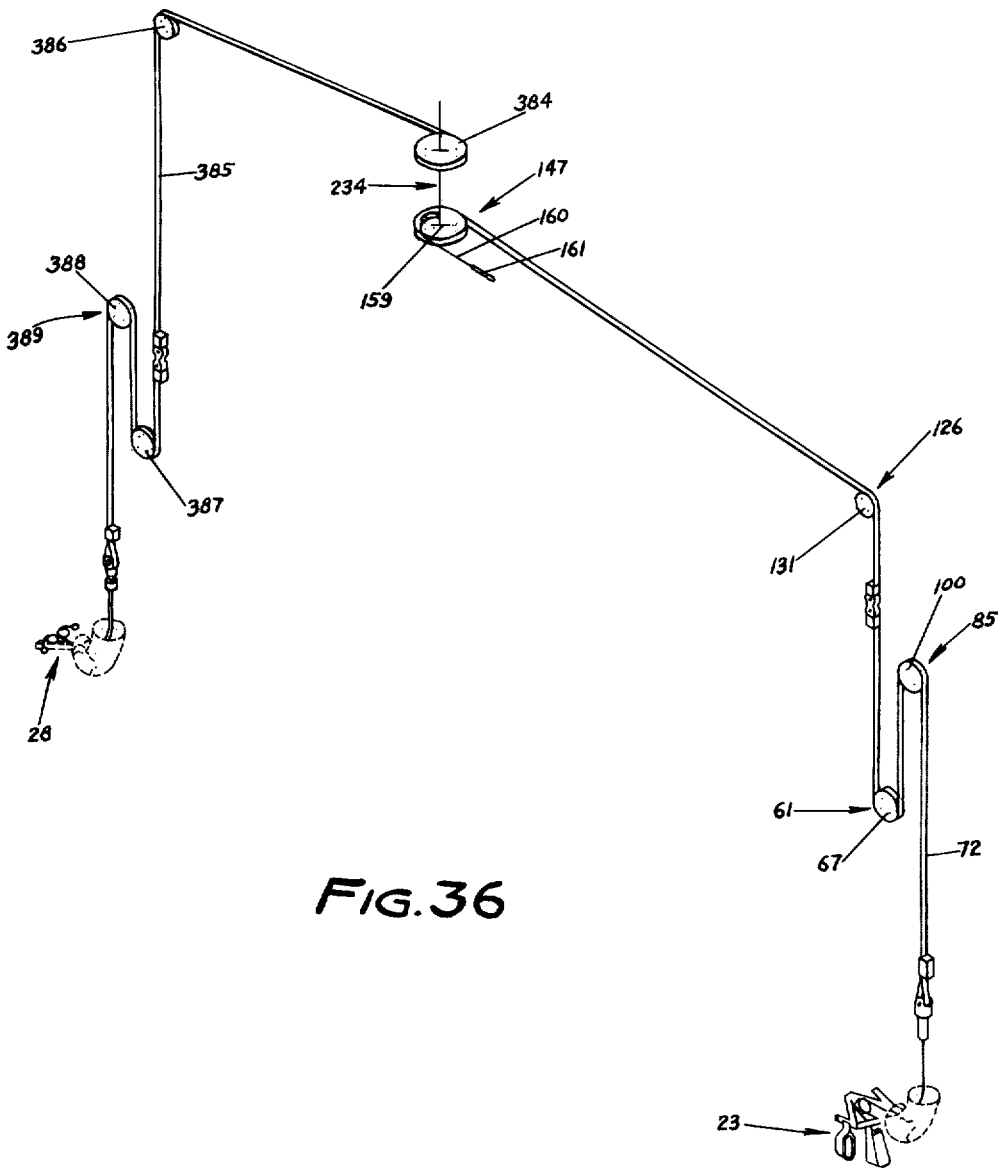
Figure 38:
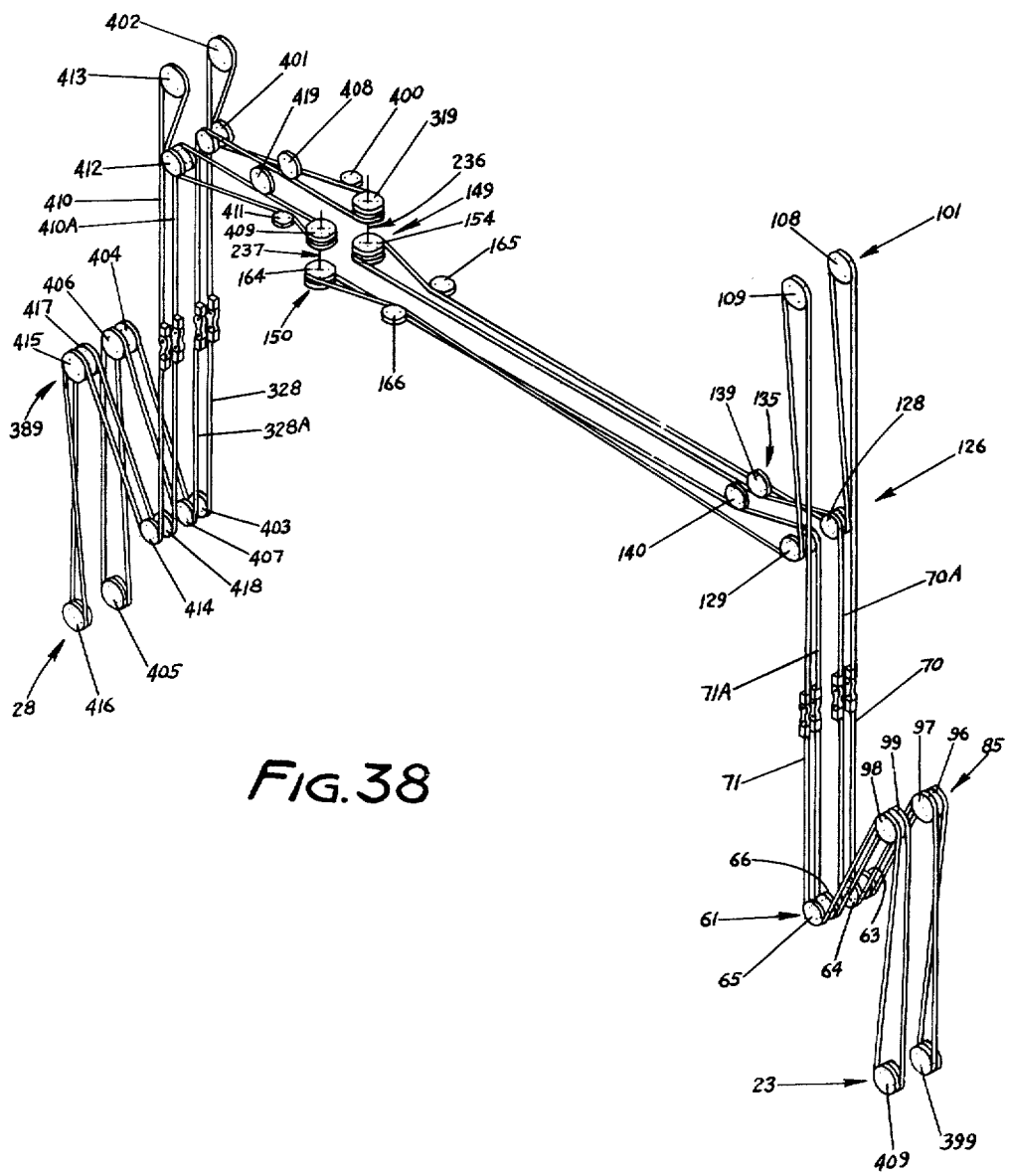

FIGURES 25 and 26 together show an enlarged right side elevation, partly in section and partly broken away, of the seal tube and transfer plate structure;

FIGURE 26A is a fragmentary elevation, partly in section, taken generally along the line 26A—26A of FIGURE 26 and in the direction of the arrows;

FIGURE 27 is a top plan view on an enlarged scale, partly in section and partly broken away, of the transfer plate casting of the seal tube assembly with seal packages removed;

FIGURE 28 is a fragmentary section on the line 28—28 of FIGURE 27 showing a structural detail of the transfer plate assembly;

FIGURE 29 is an enlarged vertical elevation, in section, through the seal tube transfer plate and the transfer plates of the master and slave arms in operating position and showing one exemplary rotary motion seal package or transfer unit;

FIGURE 30 is a vertical section showing a modified form of rotary seal construction;

FIGURE 31 is a vertical section showing a rotary motion rtansfer assembly adapted to coupling with master and slave arm transfer assemblies by modified heavy-duty coupling means;

FIGURE 32 is a top plan, partly broken away, of the modified coupling means of FIGURE 31;

FIGURE 32A is a fragmentary vertical section on the line 32A—32A of FIGURE 32, and in the direction of arrows;

FIGURE 33 is a schematic perspective view showing how the arms of the manipulator are interconnected through a rotary seal for conjoint angular movement (or Y motion) about the pivots at the ends of the arms;

FIGURE 34 is a schematic perspective view showing how the boom tube of the master arm of the manpulator is counterbalanced for movement relative to the trunk tube;

FIGURE 35 is a schematic perspective view showing how vertical movement of the master arm produces a corresponding vertical movement (or Z motion) in the slave arm through a rotary seal;

FIGURE 36 is a schematic perspective view showing how opening and closing of the handle or gripper on the master arm causes opening and closing of the tongs carried by the slave arm through a seal;

FIGURE 37 is a schematic perspective view showing azimuth means by which rotation of the handle about the longitudinal axis of the master arm produces a corresponding rotation through a seal of the tongs about the longitudinal axis of the slave arm; and FIGURE 38 is a schematic perspective view showing elevation and twist means by which rotation of the handle carried by the master arm about its own two axes produces corresponding rotation through a seal of the tongs on the slave arm.

Throughout this application the manipulator is described and illustrated in terms of a single horizontal support with a single master arm and a single slave arm. It is to be understood, however, that in virtually all instances the manipulators are employed in spaced pairs so that the operator, by the use of two master control arms, is able to manipulate two slave arms in order to reproduce the action of a pair of hands in the remote area on the opposite side of the barrier wall.

*General Arrangement of Parts (FIGURE 1)*

Figure 1:
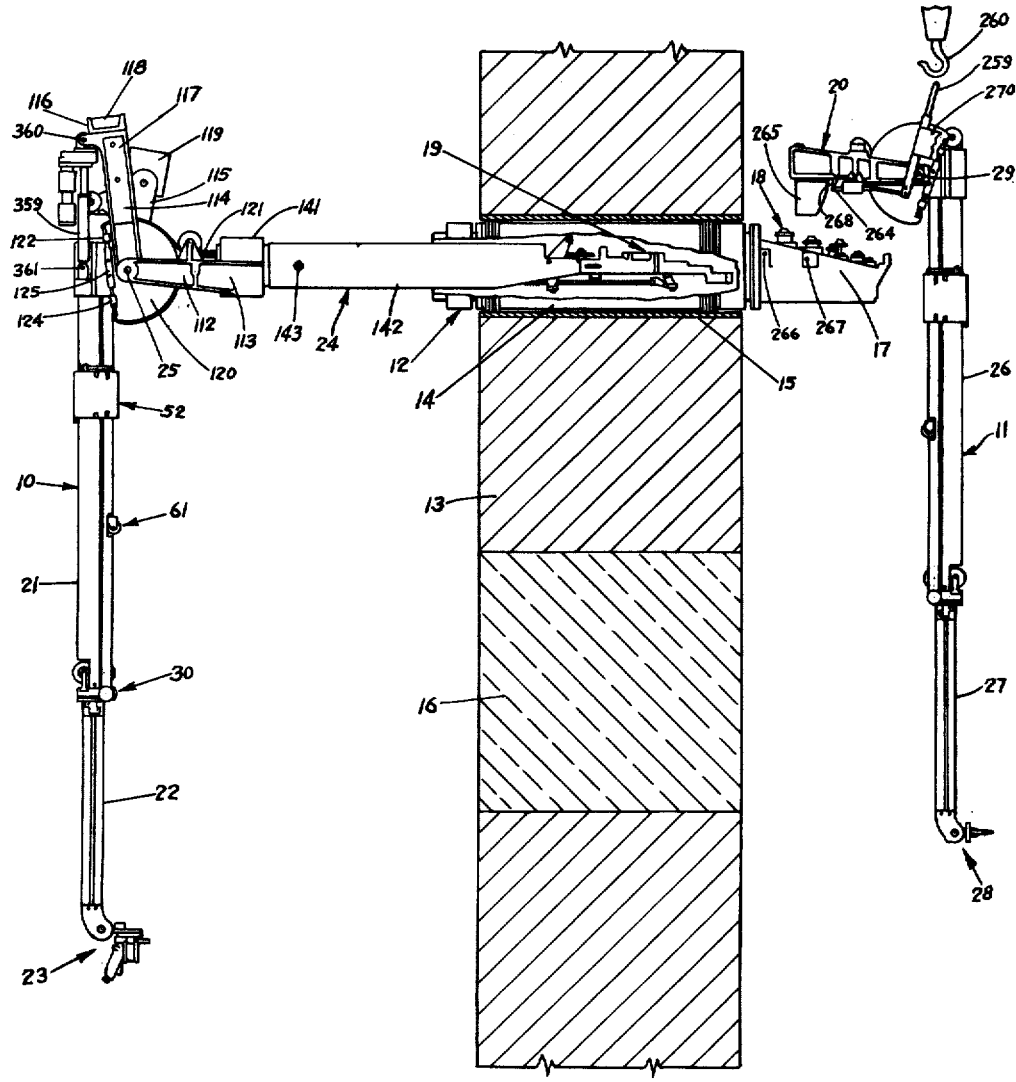
FIGURE 1 is an elevation, partly in section and partly broken away, showing the subassemblies of the remote control manipulator of the present invention being mounted in a protective barrier wall.

Referring now to the drawings, and particularly to FIGURE 1, the sealed master slave manipulator according to the present invention comprises generally a master arm assembly indicated generally at 10, a slave arm assembly indicated generally at 11, and a seal tube assembly indicated generally at 12. The seal tube assembly 12 functions as a tubular horizontal support for the master and slave arms and extends through a generally vertical barrier or shielding wall 13 being mounted therein in a horizontal tube 14 secured so as to be structurally integral with the wall. The mounting tube 14 is provided with a finely finished bore. The seal tube is statically sealed therein by means of a plurality of mechanically expandable seal rings indicated generally at 15 to form a lock seal which may be pressurized and continuously monitored, as explained in detail hereinafter.

The thickness of the wall 13 and the length of the seal tube assembly and the associated mechanism of the master arm assembly which fits therein are dependent upon the type of environment against which the wall forms a barrier. If the wall is to shield an operator from radioactive emanations the wall must necessarily be constructed of radiation absorbing material and be relatively thick. On the other hand, if the wall is to shield the operator from noxious bacteria or similar substances, or against the pressure of deep water or the vacuum of outer space, or other similar different environmental conditions, the wall may be relatively thinner and the mechanism extending through the wall relative shorter. In either instance, the wall is provided with a window 16 of approximately the same thickness as the wall and formed, for example, in the case of a radiation barrier, of laminated plate glass.

The master arm assembly 10, the slave arm assembly 11, and the seal tube assembly 12 are all completely separable units. These units are standardized and are interchangeable with different corresponding units in the event of failure or contamination of one or two of these units making up the manipulator, without the necessity of replacing all of the manpulator units. In normal non-operating position the master arm 10 and the slave arm 11 are balanced to hang generally vertically. The master arm is in a safe area to the left side of the wall 13, as viewed in FIGURE 1, and the slave arm is in an environment to the right of the wall, as viewed in FIGURE 1, from which the operator is shielded. The end of the seal tube 12 which communicates with the safe area in which the master arm is located is open and communicates with the environment of the operator. The opposite end of the seal tube is closed. For clarity, the assemblies are shown separated.

That closed end of the seal tube which extends into the environment of the slave arm is provided with a transfer plate, indicated generally at 17, carrying a plurality of double rotary seal cartridges or packages, indicated generally at 18, housing sealed motion transfer shafts by which motions of the master arm are transmitted to the slave arm. As explained in detail hereinafter, each transfer shaft housed in a seal cartridge is provided with couplings at both ends. The lower couplings of the transfer units are on the bottom face of the seal tube transfer plate and couple with corresponding elements in a master transfer plate, indicated generally at 19. The upper couplings are exposed to the slave compartment and couple with corresponding elements in a slave transfer plate, indicated generally at 20, which is an integral part of the slave arm assembly and is positioned at the upper end thereof.

Figure 2:
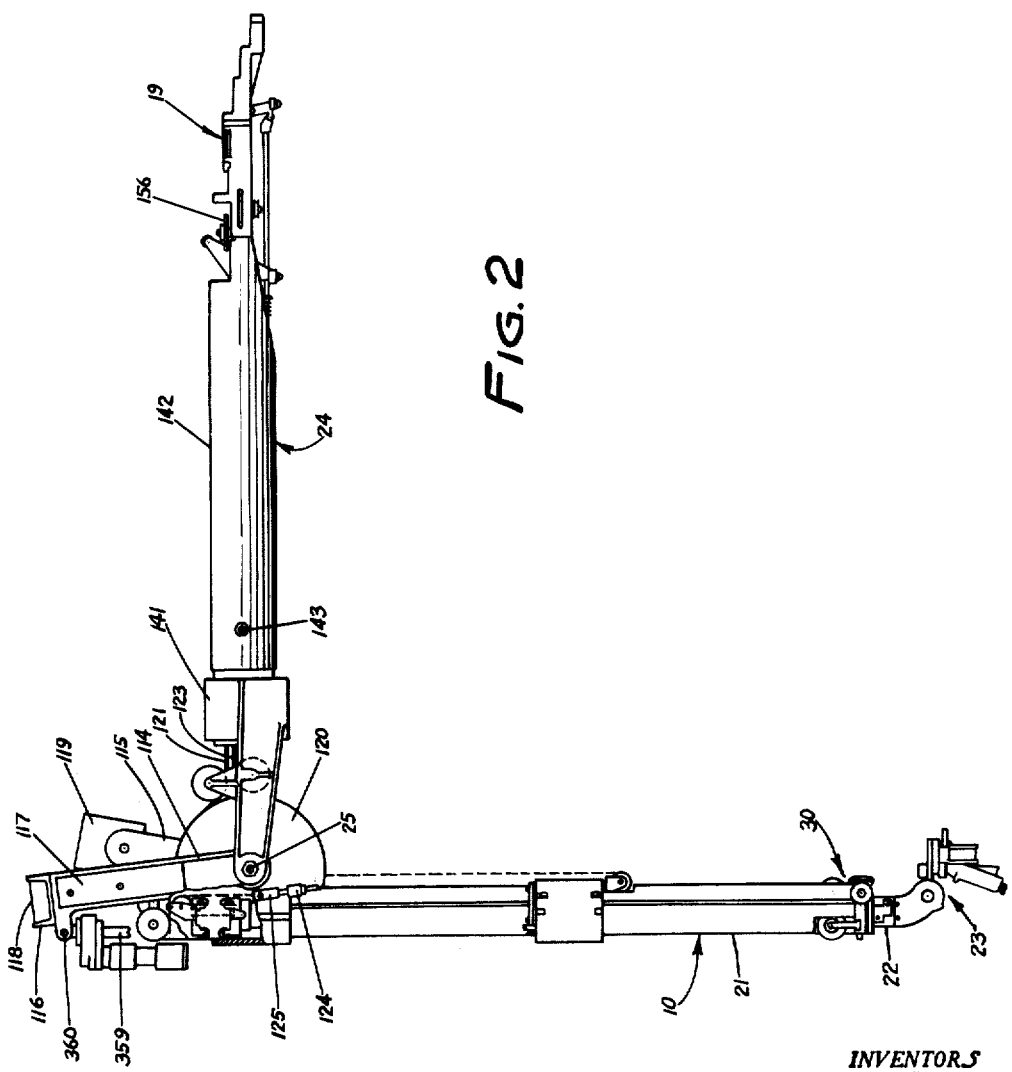
FIGURE 2 is an elevation, partly in section and partly broken away, of the master arm subassembly of the sealed manipulator.

*The Master Arm (Figures 1 and 2)*

The master arm includes an elongated trunk tube 21 and a boom tube 22 of lesser diameter fit telescopically into the trunk tube and adapted to move longitudinally with respect to the trunk tube. The lower end of the movable boom tube carries a wrist joint and handle or gripper means, indicated generally at 23, by means of which the operator controls grasper or tong means on the slave arm. The details of construction and operation of the wrist joint and handle means are described generally in United States Patent No. 2,764,301 issued to Goertz et al. on September 25, 1956 and accordingly are not repeated here. The manner in which the movements of the handle are transmitted along the length of the master arm through the seal tube and the rotary mechanical seals and through the slave arm to operate the tong means is explained hereinafter.

The master arm assembly includes a substantial horizontal portion 24 carrying the master arm transfer assembly 19 at its free extremity and adapted to fit into the seal tube assembly 12. The generally vertical boom tube and trunk tube components of the master arm are pivotally connected to the through tube portion of the master arm at 25 so as to permit relative angular movement between the generally vertical and generally horizontal components of the master arm assembly.

Figure 3:
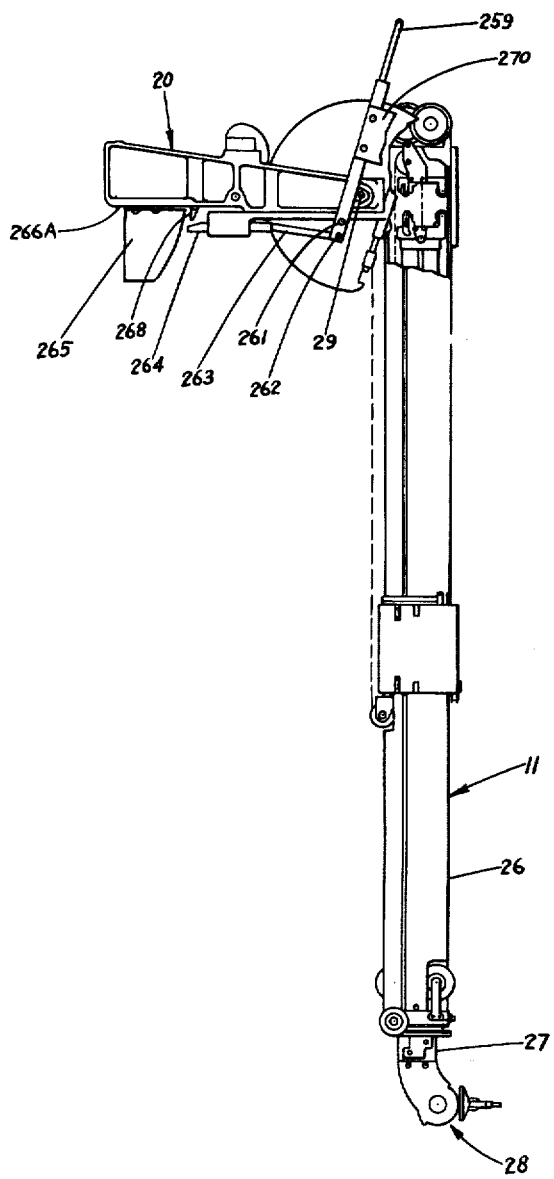
FIGURE 3 is an elevation, partly in section and partly broken away, of the slave arm subassembly.
Figure 4:
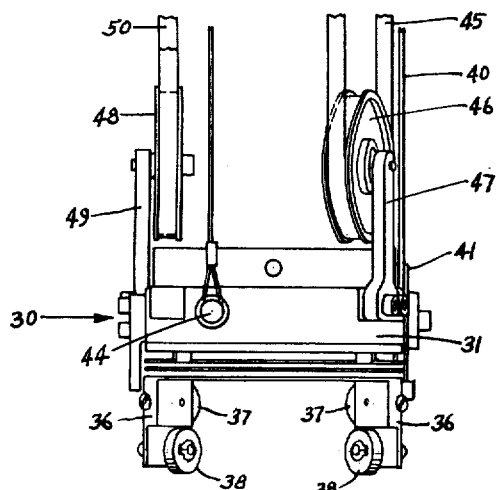
FIGURE 4 is a fragmentary front elevation (from the view-point of the operator) on an enlarged scale of the lower end of the master arm trunk tube showing the azimuth subassembly.
Figure 5:
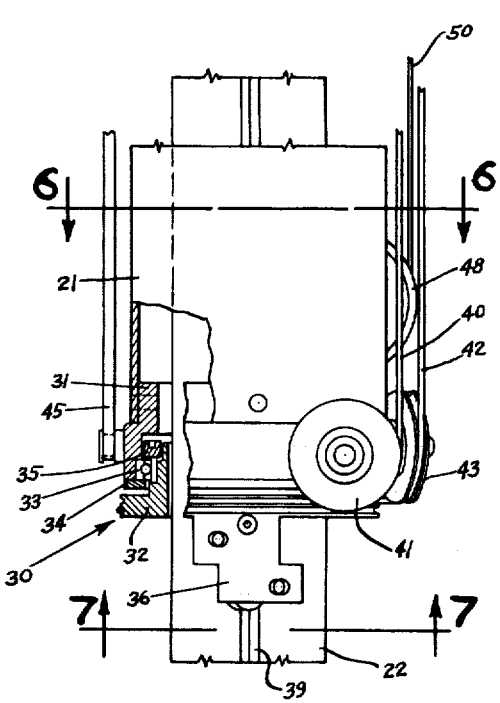
FIGURE 5 is a fragmentary right side elevation (from the position of the operator) on an enlarged scale of the azimuth subassembly at the lower end of the master arm trunk tube.
Figure 6:
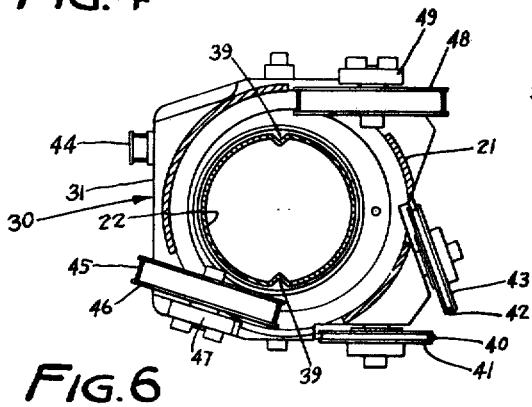
FIGURE 6 is a transverse section through the master arm, on the line 6—6 of FIGURE 5 and in the direction of the arrows.
Figure 7:
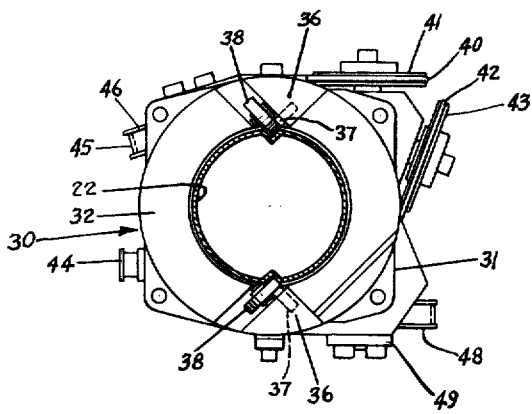
FIGURE 7 is a transverse section through the master arm, on the line 7—7 of FIGURE 5 and in the direction of the arrows.

*The Slave Arm (Figures 1 and 3)*

The slave arm includes an elongated trunk tube 26 and a boom tube 27 of lesser diameter fit telescopically into the trunk tube and adapted to move longitudinally with a respect to the trunk tube in response to similar movement of the boom tube 22 of the master arm. The lower end of the movable slave arm boom tube carries wrist joint and tong means, indicated generally at 28, whose movement is controlled by the operator manipulating the handle or gripper means 23 on the master arm. The slave arm is pivotally connected at 29 to the slave transfer plate 20 so as to permit angular movement of the slave arm corresponding to similar movement of the master arm.

In general, except for noted differences as, for example, the handle means on the master arm and the tong means on the slave arm, the slave arm is substantially a mirror image of the master arm. The elements of the master arm find their counterparts in the slave arm in the same relative operating positions. In view of this virtual duplication of elements as between the master and slave arms, the elements will be described in detail with respect to the master arm and this description will not be repeated with respect to the slave arm, except where structural changes other than reversal of relative positions occur.

*Azimuth Sub-Assembly (Figures 4 through 7)*

Referring now to FIGURES 4 through 7, there is shown an azimuth sub-assembly positioned at the lower end of the master arm trunk tube. The azimuth sub-assembly provides the means by which rotation of the handle or gripper of the master arm about the longitudinal axis of that arm may be transmitted to produce a corresponding rotation of the tongs of the slave arm about the longitudinal axis of that arm. The azimuth subassembly is indicated generally at 30 and includes a generally annular base block or ring 31 fit telescopically into the bottom end of the master trunk tube 21. The outer periphery of base ring 31 is generally rectangular with a circular opening through which the master boom tube extends.

A double grooved drum or pulley 32 in the form of an annular ring is journaled for rotation within the circular opening of the base ring 31 about the longitudinal axis of the master arm and in a plane perpendicular to that axis. Double drum 32 is journaled by means of a ring ball bearing 33, one race of which is held in the bottom of the base ring 31 by means of a retainer ring 34 and the other race of which is held on a shoulder around the ring drum by means of a retainer ring 35.

A pair of guide roller brackets 36 extend downwardly from the bottom surface of the drum 32. Each of the guide roller brackets carries a pair of guide rollers 37 and 38 which are journaled for rotation about axes which are parallel to the plane of rotation of the double drum and in planes perpendicular to their own axes of rotation. The respective axes and planes of rotation of guide rollers 37 and 38 are disposed at approximately right angles to one another. The peripheries of the guide rollers bear against the surfaces of a longitudinal groove 39 in each side of the outside wall of the master arm boom tube both to guide the boom tube in its telescopic movement relative to the trunk tube and to impart to the azimuth drum 32 the rotation of the boom tube relative to the trunk tube.

The rim of drum 32 is provided with two parallel grooves each adapted to receive a thin wire rope or cable. A first cable 40, which extends in a clockwise direction in the lower groove of the drum 32 when viewed from the top, is guided around an idler or guide pulley 41 mounted on the right rear outside of the base ring 31 and journaled for rotation in a plane parallel to the longitudinal axis of the master arm. Guide pulley 41 is so positioned with respect to the lower groove of drum 32 that the cable 40 is guided tangentially off pulley 41 onto the lower groove of drum 32, the latter drum rotating in a plane perpendicular to the plane of rotation of pulley 41. The end of cable 40 is secured to drum 32 by any suitable fastening means.

A second cable 42 extends around a guide pulley 43 mounted on the back right side of the base ring 31 and journaled for rotation in a plane parallel to the longitudinal axis of the master arm. Cable 42 extends around the upper groove of drum 32 in a counterclockwise direction, when viewed from the top, and the end of the cable is secured to the pulley. The rims of guide pulley 43 and the upper groove of drum 32 are so related that the cable 42 passes tangentially off guide pulley 43 onto the top groove of drum 32 which rotates in a plane perpendicular to the plane of rotation of the guide pulley.

It will thus be seen that the cables 40 and 42 are in opposed relation so that as drum 32 is rotated in a clockwise direction, as viewed from the top, a greater length of cable 40 will be wound about the drum and, at the same time, cable 42 will be released from the pulley. The rotary movement of drum 32 and boom tube 22 on the longitudinal axis of the master arm is transmitted by means of cables 40 and 42 to impart corresponding rotary movement to the boom tube of the slave arm, as described in greater detail hereinafter.

A stud 44 extends out from the left front edge of the azimuth base ring 31 to secure one end of a tape 45, whose other end is secured to a full speed carriage sub-assembly (indicated generally at 73, FIGURES 11, 12 and 13) mounted at the top of the master arm boom tube. Tape 45 extends upwardly from the azimuth sub-assembly to an idler pulley 51 on a counterweight 52 (FIGURES 8 to 10), and thence downwardly to a pulley 46 supported by a bracket 47 extending upwardly from the front right side of the azimuth sub-assembly base ring 31 and upwardly again to the full speed carriage assembly at the top end of the master arm boom tube. In its path from the stud 44 to the counterweight pulley 51 and back to pulley 46, the tape 45 is on the outside of the trunk tube. From the pulley 46 to the boom tube full speed carriage sub-assembly the path lies in the space between the boom tube and the trunk tube.

A further pulley 48 is mounted at the rear left side of the azimuth sub-assembly supported for rotation in a plane parallel to the longitudinal axis of the master arm from a bracket 49 mounted on the base ring 31. A tape 50, which extends from the boom tube full speed carriage, follows a path between the boom tube and the trunk tube downwardly to and around pulley 48 and thence, upwardly on the outside of the trunk tube on its way to the rotary transfer means for imparting generally vertical movement of the master arm to the slave arm to produce a corresponding movement. It will be noted that the bottom end of the trunk tube is cut away to accommodate pulleys 46 and 48 and provide ports through which tapes 45 and 50 may pass from the space between the boom tube and trunk tube to outside of the trunk tube.

Counterweight and Trunk Tube Pulley Bank
*(FIGURES 8, 9 and 10)*

Referring now to FIGURES 8 through 10, there is shown an intermediate portion of the master arm trunk tube and counterbalance structure in the position wherein the boom tube 22 is telescoped into the trunk tube 21 to the maximum extent. With the boom tube in this position, the counterweight structure, indicated generally at 52, is in its lowermost position as shown. The counterweight is in the form of a relatively thick and heavy cylindrical tube of a size to fit on the outside of the trunk tube 21 in sliding engagement therewith. To facilitate this sliding engagement between the counterweight and the trunk tube, a plurality of guide rollers 53 and 54 are journaled in slots in the wall of the tubular counterweight. The guide rollers 53 and 54 are journaled for rotation in planes generally parallel with the longitudinal axis of the master arm but disposed with respect to one another at approximately right angles. The purpose of this is to position the guide rollers so as to engage the surfaces of a longitudinal projection 55 on opposite sides of the trunk tube 21 to facilitate longitudinal motion between the counterweight and trunk tube while, at the same time, preventing relative rotation between these two elements.

The counterweight is suspended by means of a pair of tapes 56 and 57 extending from a pair of tape terminals 58 and 59, respectively, in a path upwardly along the outside front surface of the master arm trunk tube to a half speed carriage (indicated generally at 85, FIGURES 11 and 14) positioned for movement in the trunk tube above the top of the boom tube and at a different rate. A pair of resilient bumpers 60 on the top edge of the counterweight cushions it at the uppermost end of its course of travel.

A trunk tube pulley bank, indicated generally at 61, is located in a relatively wide slot or opening provided in the rear face of the master arm trunk tube facing the barrier wall. A bracket 62 supporting a bank of pulleys 63–67 is mounted in the opening. The pulleys 63–67 are all mounted on a single shaft 68 journaled for independent rotation relative to one another. The pulleys are disposed in the opening in the trunk tube to rotate on an axis perpendicular to the longitudinal axis of the master arm and spaced from it. The pulleys are disposed in the opening so as to permit tapes to follow a path downwardly along the outside surface of the trunk tube and counterweight and around the pulleys and upward in the space between the trunk tube and boom tube. A pair of bumpers 69 on the top of pulley bracket 62 cushions the counterweight at the lowermost extent of its path of travel.

A tape 70, associated with elevation and twist motions, follows a path in one direction downwardly along the outside of the trunk tube and around pulley 63 and thence upwardly between the trunk tube and boom tube toward a pulley on the half speed carriage. A companion tape 70A follows a path downwardly from the half speed carriage between the boom tube and the trunk tube, around pulley 64 and thence, upwardly on the outside of the trunk tube. As described in detail hereinafter, tapes 70 and 70A along with tapes 71 and 71A enable the elevation and twist movements of the handle carried by the master arm to be imparted to the tong means on the slave arm. It will be noted that as pulley 63 rotates in one direction, pulley 64 rotates in the other direction. Tape 71 passes around pulley 65 to rotate it in one direction and tape 71A passes around pulley 66 in the other direction. A further tape 72, which moves in response to opening and closing of the handle on the master arm in order to impart corresponding movement to the tong on the slave arm, passes around pulley 67 in its path of travel between the half speed carriage downwardly between the boom tube and trunk tube and then upwardly along the outside of the trunk tube.

Full Speed Carriage *(FIGURES 11, 12 and 13)*

Figure 11:
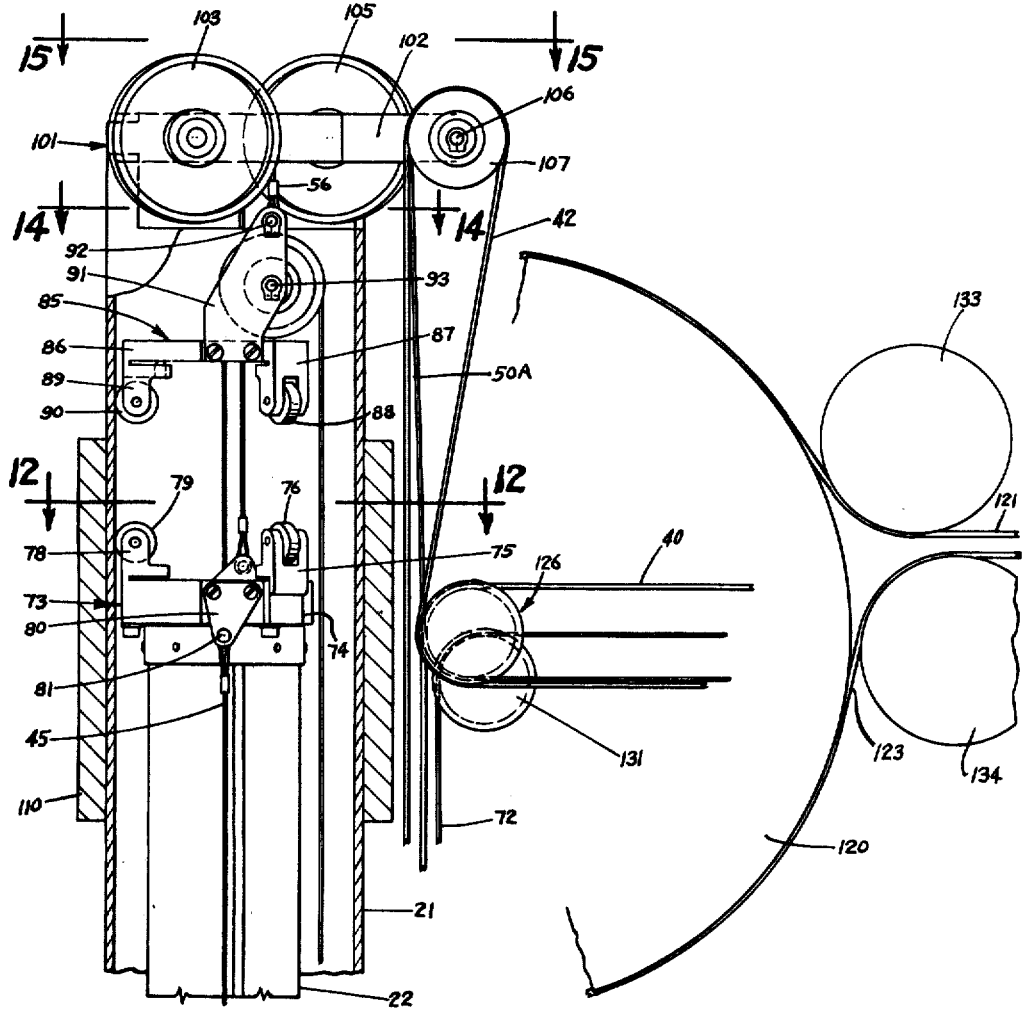
FIGURE 11 is a right side elevation, partly in section and partly broken away, of the upper end of the master arm assembly showing the pivot structure and associated mechanism at the upper end of the master arm trunk tube.

Referring now to FIGURES 11, 12 and 13, there is shown a full speed carriage sub-assembly, indicated generally at 73, rotatably mounted on the top of the master arm boom tube 22 for longitudinal movement therewith within the master arm trunk tube 21. The full speed carriage 73 includes a generally annular ring 74 secured to the top of the boom tube. Ring 74 carries a pair of bifurcated upwardly extending brackets 75 symmetrically disposed about 120° apart on the rearward or wall side of the full speed carriage. Each of the brackets 75 carries a guide roller 76 journaled for rotation in a plane generally through the longitudinal axis of the master arm. Each of the guide rollers 76 is adapted to seat in a shallow groove 77 in the inside wall of the trunk tube opposite projections 55 for the purpose of maintaining the components at the upper end of the boom tube in alignment and to prevent relative rotation of the full speed carriage with respect to the trunk tube.

A further upstanding bifurcated bracket 78 is disposed centrally on the front or operator's side of the full speed carriage and is fitted with a guide roller 79 adapted for rotation along the inside of the trunk tube in a plane through the longitudinal axis of the master arm. Rollers 76 and 79 together guide and align the upper end of the boom tube for movement within the trunk tube.

On the right side of the full speed carriage 73 there is mounted a bracket 80 carrying a stud 81 to which is attached the opposite end of tape 45, by means of which movement of the counterweight and the half speed carriage is controlled relative to the movement of the boom tube. On the opposite or left side of the full speed carriage, there is a further stud bracket 82 supporting a pair of studs 83 and 84. The upper stud 83 has secured to it one end of tape 50A, which functions to impart vertical movement of the master arm boom tube within the master arm trunk tube to the slave arm boom tube within the slave arm trunk tube through a rotary seal, as described in greater detail hereinafter. One end of a companion tape 50 is secured to the lower stud 84.

Half Speed Carriage *(FIGURES 11 and 14)*

Referring now to FIGURES 11 and 14, there is shown a half speed carriage sub-assembly, indicated generally at 85, mounted in the master arm trunk tube above the full speed carriage at the top of the master arm boom tube. The half speed carriage sub-assembly includes a generally circular base supporting a pair of downwardly depending bifurcated brackets 87 spaced apart about 120° on the rearward or wall side of the half speed carriage. Each bracket carries a guide roller 88 journaled for rotation in a plane generally through the longitudinal axis of the master arm and adapted to roll in the groove 77 in the inside surface of the master arm trunk tube. The half speed carriage includes another downwardly depending bifurcated bracket 89 disposed centrally on the front or operator's side of the carriage and supporting a guide roller 90 journaled for rotation in a plane through the longitudinal axis of the master arm. Guide rollers 88 and 90 together function to maintain the half speed carriage aligned in the trunk tube for movement therein while guarding against relative rotation between the half speed carriage and the trunk tube.

The half speed carriage also includes a pair of upwardly extending brackets 91 supporting between them a pair of parallel shafts 92 and 93. Upper shaft 92 is provided with a pair of spaced apart peripheral notches or grooves 94 and 95. One end of tape 56, whose other end is secured to the counterweight 52, is secured to the half speed carriage in notch or groove 94. One end of tape 57, whose opposite end is secured to counterweight 52, is secured to the half speed carriage in notch or groove 95.

A plurality of pulleys 96–100 are supported on the lower shaft 93. Each of the pulleys 96–100 is journaled for rotation independent of the other. Tape 70 passes over pulley 96 and tape 70A passes over pulley 97 moving in opposite directions. Tape 71 passes over pulley 98 and tape 71A passes over pulley 99 moving in opposite directions. This occurs during manipulation of the master arm handle means about its own two axes. Tape 72 responsive to opening and closing of the handle or grasping means, passes over pulley 100 of the half speed carriage. It will be noted that the tapes 70, 70A, 71, 71A and 72 passes over pulleys 96–100, respectively, in their path of travel from the wrist joint and handle or gripper means to the trunk tube pulley bank 61 containing pulleys 63–67. As will be apparent hereinafter, the half-speed carriage assembly functions to separate Z motions from others so as to eliminate the necessity for all tapes and all seals to move during execution of the Z motions. This substantially reduces friction and wear.

*Upper Pulley Bank (FIGURES 11 and 15)*

Referring now to FIGURES 11 and 15, there is shown an upper pulley bank indicated generally at 101. The upper pulley bank is mounted at the top end of the trunk tube 21 and includes a bracket 102 secured to the trunk tube. A pair of pulleys 103 and 104 are mounted on opposite sides of bracket 102 each pulley journaled for rotation in a plane parallel to the longitudinal axis of the master arm. Tape 56 passes over pulley 103 between the half speed carriage and the counterweight, and tape 57 passes over pulley 104 between the half speed carriage and the counterweight. A pulley 105 is mounted on the left side of bracket 102 journaled for rotation in a plane parallel to the longitudinal axis of the master arm. Tape 50A passes over pulley 105 between the full speed carriage and the rotary seal transfer means.

The back edge of bracket 102, toward the side of the barrier wall, is bifurcated and carries a shaft 106 on which are journaled for independent rotation pulleys 107–109. Cable 42 of the azimuth means passes around pulley 107 between pulley 43 of the azimuth sub-assembly and the sealed transfer means. Tapes 70 and 71 of the elevation and twist means pass over pulleys 108 and 109, respectively, in the path of their travel from pulleys 63 and 65, respectively.

*Pivot Structure (FIGURES 1, 2, 11, 16, 17, 18 and 18A)*

The master arm trunk tube is supported in a collar or sleeve 110 secured adjacent the upper end of the trunk tube. The collar or sleeve 110 is provided with a pair of spaced apart arms 111 extending toward the barrier wall by means of which the master arm is pivotally supported at 25 between the arms 112 of a generally horizontal pivot bracket 113. Two pair of counterweight arms 114 and 115 are mounted for independent movement about the axis of pivot 25. Arms 114 are moved with the slave arm and arms 115 are moved with the master arm. The outer pair of counterweight arms 114 are bridged at their upper extremity by a generally horizontal channel member 116. Weights 117 of appropriate size, shape and density are secured to arms 114 and weight 118 of appropriate size, shape and density is secured in the channel 116 to assist in balancing the slave arm assembly. The inner pair of counterweight arms 115 is fixed to the arms 111 of the sleeve 110. These arms are bridged at the outer extremity of the arms by a weight 119 of appropriate size, shape and density to assist in balancing the master arm.

A semi-circular grooved disc 120 is secured to the right side counterweight arm 114 for movement therewith about the pivot 25. A wire cable 121 is carried in the peripheral groove of the semi-circular disc 120 around the upper portion thereof and its free end is secured to the disc by a suitable fastener at 122. A further cable 123 is carried in the grooved peripheral edge of disc 120 at the lower portion thereof and its free end is secured at 124. A turnbuckle means 125 is provided for adjusting the tension on cables 121 and 123. Conjoint angular movement or Y motion of the arms of the manipulator about their pivots is transmitted by disc 120 acting in association with cables 121 and 123. Independent angular movement of the slave arm is also transmitted by the same means, as described hereinafter.

*Pivot Pulley Bank (FIGURES 18 and 18A)*

A pivot pulley bank, indicated generally at 126 in FIGURES 18 and 18A, is provided at the master arm pivot. A plurality of double grooved pulleys 127–130 are all journaled to rotate about the pivot axis in planes parallel to the longitudinal axis of the master arm. Pulleys 127–130 are journaled to rotate independently of one another. These pulleys are double in the sense that their rims have two grooves or channels. The grooves or channels of each double pulley obviously rotate together and in the same direction. Cable 40, which is associated with the azimuth means, passes over the right groove of pulley 127 and cable 42, also associated with the azimuth means, passes under the pulley in the left groove. Thus, although these cables move in opposite directions when operating, they pass around the double pulley moving in the same direction because one cable passes over and the other passes under the pulley. By this means, variations in length of the cables (and tapes), due to rotation of the master arm on its pivot axis, are eliminated.

Tape 50, which is associated with vertical movement or Z motion of the arms, passes over the top of pulley 128 in the left groove and tape 50A, associated with the same means, passes under the pulley 128 in the right groove. Thus, even though these tapes move in opposite directions when the arms are being moved vertically, they pass around pulley 128 at the same speed and in the same direction because one passes over and the other passes under the pulley. Similarly, tape 70, associated with the elevation and twist means, passes under pulley 129 in the outermost groove and tape 70A passes over that pulley in the innermost groove. Here too, although the tapes in use move in opposite directions, they pass around pulley 129 at the same rate of speed and in the same direction because one passes over and the other passes under. Tape 71 passes under pulley 130 in the outermost groove and tape 71A passes over that pulley in the innermost groove moving generally in opposite directions but moving around the pulley in the same direction and at the same rate of sped because one passes over and the other passes under.

Pulley 131 is positioned to rotate in the plane of the longitudinal axis of the master arms but about an axis disposed slightly below the axis of the pivot. Tape 72 associated with the tong mechanism passes over pulley 131. This pulley is located to minimize changes in tape tension due to rotation of manipulator arm on its pivot axis.

*Intermediate Pivot Bracket Pulleys (FIGURES 18 and 18A)*

A bracket 132 on the right arm 112 of pivot bracket 113 supports a pulley 133 for rotation generally in the plane of disc 120 to guide cable 121 in its path toward the rotary transfer means. A further pulley 134 is supported on the inside face of the right pivot arm 112 to rotate in the plane of pulley 133 and disc 120 to guide cable 123 in its path toward the transfer means. Pulleys 133 and 134 are so arranged that the paths of the cables 121 and 123 respectively are tangential with both the disc and the pulleys.

An intermediate guide pulley bank, indicated generally at 135, is disposed between the arms 112 of pivot bracket 113 spaced toward the barrier wall from the pivot pulley bank. A shaft 136 extends between the arms of the pulley bracket. Pulleys 137–140 are mounted on the shaft each journaled for independent rotation in a plane parallel to the longitudinal axis of the master arm. Cable 42, associated with the azimuth means, is guided over pulley 137 in its path from pulley 127 to the rotary seal transfer means. Tape 50A, associated with the vertical movement or Z motion, is guided over pulley 138 in its path between pulley 128 and the rotary seal transfer means. Tapes 70A and 71A, associated with the elevation and twist means, are guided under pulleys 139 and 140, respectively, in their paths between pivot pulleys 129 and 130, respectively, and the rotary transfer means.

*Master Arm Transfer Assembly*
*(FIGURES 18, 19 and 20)*

As shown in FIGURES 18 to 20, the pivot bracket 113 includes a generally annular collar 141 secured to the end of an elongated cylindrical tube 142. Tube 142 is provided with a plurality of radially extending locating pins 143 adapted to fit into slots 144 (FIGURE 25) of the seal tube structure 12 for the purpose of coupling the master arm transfer assembly to the seal tube. The free end of tube 142 which extends into the seal tube 12 carries a master arm transfer plate, indicated generally at 19. The master transfer plate 19 is a casting which carries a plurality of rotary motion transfer or coupling means by which longitudinal movement of tape and cable elements of the master arm is converted to rotary motion for transfer through a rotary seal to impart corresponding motion to elements of the slave arm assembly.

The rotary transfer means for transmitting Y motion, that is, conjoint angular motion of the arms on their pivots is indicated generally at 145. The coupling means for transmitting Z motion, that is, extension and retraction of the boom tubes, is indicated generally at 146. The master transfer means for the tong motion is indicated generally at 147. The master azimuth transfer means is shown generally at 148 and the elevation and twist transfer means are indicated generally at 149 and 150. The structures of all of the motion transfer means are generally the same. One of the elevation and twist transfer means is shown in detail in FIGURE 29 and suffices to show the general structure of all the transfer means. As there generally shown, each of the transfer or coupling means includes a short generally vertical shaft 151 resiliently mounted on a spring 152 in a cavity 153 in the master transfer plate and carrying a drum or pulley 154 for rotation on an axis perpendicular to the longitudinal axis of tube 142 and in a generally horizontal plane parallel to the longitudinal axis of tube 142.

As indicated schematically in FIGURE 33 and shown structurally in FIGURES 18 through 20, the master Y motion transfer means 145 includes a drum 155 whose periphery is provided with two grooves. One end of cable 121 is secured to the drum in the uppermost groove. One end of cable 123 is secured to the drum in the lower groove. The two cables extend around the drum in their respective grooves in opposite directions so that one cable will be wound about the drum as the other is unwound. An idler 156 is mounted on the top surface of the master arm transfer plate 19, journaled to rotate on an axis perpendicular to that surface and in a plane parallel to that surface. Idler 156 is disposed between pulley 133 and Y motion transfer drum 155 to guide cable 121 toward the transfer drum 155.

As shown schematically in FIGURE 35, the master Z motion transfer means 146 includes a drum 157 journaled for rotation on a generally vertical axis end in a generally horizontal plane and having two peripheral grooves. One end of tape 50 is attached to the drum in the uppermost groove and one end of tape 50A is attached to the drum in the lowermost groove. The tapes extend about the drum 155 in opposite directions so that, as the drum is rotated, one tape is wound upon it and the other is unwound. An idler 158 mounted on the bottom of the master arm transfer plate for rotation about the generally vertical axis and in a generally horizontal plane guides tape 50 in its path from the left groove of pivot pulley 128 to the top groove of drum 157.

As shown schematically in FIGURE 36, the tong motion transfer means 147 includes a grooved drum 159 upon which tape 72 is wound in one direction. A spring 160 secured in the master arm transfer plate at 161 (FIGURE 20) tensions the drum in the opposite direction. Spring 160 functions to normally maintain the fingers of the tong or gripper means separated except when closed at the direction of the operator in response to pressure on the handle means of the master arm.

As shown schematically in FIGURE 37, the azimuth motion transfer means 148 includes a drum 162 journaled for rotation about a generally vertical axis and in a generally horizontal plane. The periphery of drum 162 is provided with double grooves. One end of cable 42 is wrapped around the drum in the uppermost groove and secured thereto. One end of cable 40 is wrapped around the drum in the opposite direction in the lowermost groove and secured to the drum. An idler 163 mounted on the bottom of the master arm transfer plate and journaled for rotation on a generally vertical axis and in a generally horizontal plane guides cable 42 between pulley 137 and the drum 162.

As shown schematically in FIGURE 38 and structurally in FIGURE 29, the elevation and twist motion transfer means 149 and 150 include identical drums 154 and 164, respectively. Both drums are journaled to rotate on generally vertical axes and in a generally horizontal plane. Tape 70 is guided around an idler 165 which is mounted on the bottom of the master arm transfer plate for rotation in the same plane as the uppermost groove of drum 154. The end of tape 70 extends around drum 154 in the uppermost groove and is secured thereto. Tape 70A extends around drum 154 in the opposite drection in the lowermost groove and is secured thereto. Tape 71 is guided from the left groove of pivot pulley 130, around an idler 166 mounted on the bottom of the master arm transfer plate and journaled for rotation in the same plane as the upper groove of drum 164. The end of tape 71 extends around drum 164 in the upper groove and is secured thereto. Tape 71A extends around the drum 164 in the lowermost groove in the opposite direction and is attached thereto.

*Transfer Assembly Locating and Aligning Elements*
*(FIGURES 18, 19 and 20)*

In order to assist in locating and aligning the master arm assembly plate with the seal tube and seal tube transfer plate there is provided an upwardly extending bracket 167 on the right side of the top surface of the master arm transfer plate 19 which supports a pin 168 which is adapted to fit into and seat in a slotted bracket 169 (FIGURE 26A) in the end of the seal tube transfer plate 17. To further assist in the alignment of the transfer plates there is provided a generally vertically extending hole 170 in the end of the master arm transfer plate which is most remote from the operator. A pin 171 (FIGURE 26) is adapted to fit into and seat in hole 170 to locate the master transfer plate assembly in operative position within the seal tube.

In order to be able to freely slide the transfer plate assembly of the master arm into and out of the seal tube, it is necessary that the coupling elements of the rotary transfer means be adapted to be engaged and disengaged. In order to bring these elements into operating engagement, it is necessary that the entire master arm transfer assembly be lifted after it is inserted in the seal tube. Thus, when the master transfer plate assembly is inserted in the seal tube to its farthestmost extent and located by means of pins 143 and slots 144, and pin 168 and slot 169, the mechanism is then lifted to bring pin 171 and hole 170 into engagement and then lifted farther to bring the motion transfer elements into engagement.

An eccentrically mounted triangularly shaped arm 172 composed of a pair of spaced apart plate members is journaled for pivotal rotation on a transverse generally horizontal shaft 173 which extends across tube 142 of the master arm transfer plate assembly. The uppermost end of arm 172 is fitted with a roller 174. The lowermost end of arm 172 is fitted with a pair of outwardly extending bracket members 175 each of which supports a flange caster 176 on its bottommost surface. A short connecting rod 177 is pivotally mounted between the plates of arm 172 at 178. The opposite end of connecting rod 177 is forked and is pivotally connected at 179 in a longitudinally extending transverse slot to a longer connecting rod 180. A further bracket 181, mounted in the underside of the master arm transfer plate to pivot on shaft 182, supports a pair of casters 183. A short link 184 is pivotally connected at 185 to caster bracket 181 and is rigidly connected at 186 to the end of connecting rod 180.

As connecting rod 180 is moved in the direction toward the operator's side of the barrier wall, bracket 181 is rotated downwardly so that casters 183 bear against the bottom wall of seal tube 12 and give an upward thrust for moving the master arm transfer plate up into engagement with the bottom of the seal tube transfer plate. At the same time, eccentric arm 172 is tilted downwardly and casters 176 bearing against the bottom wall of the seal tube assist in giving the master arm transfer plate a further upward thrust. It is desired that the thrust of casters 183 be exerted first and then be immediately followed by the thrust exerted by casters 176. This result is accomplished by means of a coil spring 187 around the connecting rod 180, which bears against the pivot pin 179 and a fixed grip ring 188, because pin 179 extends through a slot in the rod 180 and spring 187 tends to push the pin away from the slave arm end of the slot. The pin is not engaged to actuate connecting rod 177 to tilt arm 172 until the bracket bearing casters 183 has first been tilted downwardly.

Connecting rod 180 extends through tube 142 and collar 141 and an apertured block 189 rigidly secured in the center of the bottom wall of the tube. The end of rod 180 is threaded. Rotation of a nut 190 against block 189 functions to crank connecting rod 180 in one direction to elevate the master arm transfer plate into operative engagement with the bottom surface of the seal tube transfer plate and in the other direction to disengage the transfer plates. When connecting rod 180 is moved in the direction toward the slave arm it functions to tilt casters 176 and 183 forward and out of engagement with the coupling elements on the inside surface of the seal tube. At the same time, roller 174 is tilted backward and upward and into engagement with the top of the inside surface of the seal tube. Roller 174 thus functions to exert a positive downward thrust on the master arm transfer plate assembly in order to disengage the elements of the transfer plates.

In order to permit a small amount of play or lash in the master transfer plate 19 it is connected to the end of tube 142 by means of a coupling permitting limited relative movement between the transfer plate casting and the tube. A pair of screw heads 191 are secured on the opposite side walls of tube 142. The heads of nuts 191 are disposed in slots 192 on opposite sides of the master transfer plate casting. Sufficient play is present to permit relative movement of three or four degrees to assist in mating the corresponding operative transfer elements of the transfer plates, as will be apparent hereinafter.

The top surface of master transfer plate 19 is machined at areas 193 and 194. In the assembled manipulator, faces 193 and 194 bear against stops 195 and 196 respectively (FIGURE 26A) of the seal tube tranfer plate casting. These stops along with boss 197 (FIGURE 26) determine the plane of the master arm transfer plate relative to the seal tube transfer plate. Pin 171 in slot 170, and pin 168 in slot 169, complete the alignment.

*Lateral Rotation Feature (FIGURES 21, 22 and 23)*

Referring now to FIGURES 21 to 23, there is shown modified structure by means of which lateral rotation of one manipulator arm relative to the other may be introduced. The broad concept of lateral rotation in manipulators, the situations wherein it is useful and the advantages flowing therefrom are all discussed in United States Patent 2,888,154, issued on May 26, 1959, to Demetrius G. Jelatis et al. To introduce relative lateral rotation between the manipulator arms in the modified structure, the normal rigid coupling between tube 142 and collar 141 is replaced by a ring bearing 198. An eccentric arm 199 is secured to sleeve 141 for movement therewith. A complementary eccentric arm 200 is secured to tube 142. Jack means, such as an electrically operated screw jack 201, is connected between the two arms, being pivotally connected to arm 199 and pivotally connected to arm 200. As arms 199 and 200 are moved with respect to one another, collar 141 and associated mechanism and tube 142 and associated mechanism are rotated relative to one another. This has the effect of rotating one of the manipulator arms out of the plane defined by the longitudinal axes of the other arms and the seal tube 12.

*Seal Tube Assembly (FIGURES 24, 25, 26 and 27)*

Referring now to FIGURES 24 to 27, there are shown details of the seal tube assembly. The seal tube assembly 12 includes an inner impervious seal tube 202 and an outer seal tube 203. Outer tube 203 is adapted to be made stationary in the barrier wall in which the manipulator is located, as described in detail herein, and the inner tube is journaled for rotation within the outer tube by means of a plurality of ring ball bearings 204. A plurality of rollers 205 are journaled in the outer seal tube 203 spaced about the periphery of the outer tube for rotation in radial planes through the axis of the seal tube. The peripheries of the rollers 205 extend just beyond the outer periphery of the outer seal tube 203 in order to assist in insertion of the seal tube assembly in a tube 14 extending through the barrier wall 13 and built structurally integral therewith. The inside surface of wall tube 14 is polished to a smooth finish.

In order to effect a tight seal between the seal tube assembly and the wall tube there is provided a plurality of elastomer seal rings 15 extending around the outer surface of the outer seal tube 203 adjacent the ends thereof. The elastomer seal rings are desirably ribbed to facilitate passage of the seal tube assembly into the wall tube. Seal rings 15 are of a thickness to engage the walls of the wall tube and means are provided to compress the seal rings longitudinally in order to expand them in a radial direction in order to effect a tight positive seal between the seal tube assembly and wall tube.

A threaded stop ring 207 is rigidly secured to the slave arm end of outer seal tube 203. A spacer ring 208 extends around the outer seal tube between the seal ring 15 and the stop ring 207. A further spacer ring 209, recessed to provide a shoulder for a tubular sleeve 210, extends around the outer seal tube 204 at the opposite end of seal ring 15. The sleeve 210 functions to compress seal ring 15 at the slave arm end of the seal tube assembly longitudinally in response to pressure applied from the master arm end of the seal tube assembly. Sleeve 210 is provided with a plurality of openings 211 to coincide with the positions of rollers 205. The opposite end of sleeve 210 is supported on an annular shoulder of a spacer ring 212. A further spacer ring 213 is disposed about the outer periphery of outer seal tube 203 and a ring nut extends around the threaded master arm end of the outer seal tube 203.

Tightening of nut 214, with an appropriate spanner wrench or the like, forces spacer ring 213 against the seal ring 15 adjacent the master arm end of the seal tube assembly. As the ring nut 214 is tightened further, pressure is applied along the length of the seal tube assembly through the seal rings and the spacer rings and the sleeve 210 against the stop ring. This has the effect of compressing the seal rings longitudinally while expanding them radially into tight positive gas impervious sealing engagement with the wall tube 14. A T-connector 215 is located on the inside surface of the inner seal tube 202 in communication with an opening through that tube to the space between the inner seal tube 202 and the outer seal tube 203 and the space between the outer seal tube 203 and the wall tube 14.

The expanded seal rings 15 form a gas tight seal between the wall tube and the seal tube assembly. A rotary gas tight seal must be provided at each end of the seal tube assembly when monitoring of the seal is deemed desirable or necessary. Otherwise a single seal will suffice. This rotary seal takes the form of a metal bellows 216, one end of which is secured to a flanged ring 217. A gas tight gasket 218 is interposed between the bellows ring 217 and the end of outer seal tube 203. The bellows ring is secured tightly against the gasket 218 by means of a threaded ring 219 secured on the threaded end of outer seal tube 203 and having an inwardly extending annular flange bearing against the bellows ring 217. The opposite end of bellows 216 is secured to an annular flanged ring 220 which carries a carbon seal ring 221. The lapped surface of carbon seal ring 221 bears against the lapped surface of a mating seal ring 222 of steel or other suitable material. A gas tight gasket 223 is disposed between seal ring 222 and a shoulder adjacent the master arm end of the inner seal tube 202. The seal ring 222 is maintained against gasket 223 and against the bellows carbon seal ring by means of a threaded ring 224 secured to the threaded master arm end of the inner seal tube 202.

It will be seen that, when the inner seal tube 202 is rotated on bearings 204 with respect to the outer seal tube 203, seal ring 222 will be rotated with respect to the carbon seal ring which remains stationary. In this manner, a gas tight rotary seal is maintained at the master arm end of the seal tube assembly. A generally similar rotary seal is provided at the slave arm end of the seal tube assembly, the flanged bellows ring 217 being held in place against gasket 218 by means of stop ring 207. In place of metal bellows, other resilient mounting means may be used such as elastomer bellows, flexible metal or elastomer membranes or diaphragms, and the like. Where the environment of the slave cell is not extremely hazardous to the operator or less positive seal, as for example, a labyrinth seal, may be used.

In order to protect the bellows against the entry of dirt or dust or the like, a protective tubular shield is provided at each end of the seal tube assembly. The dust shield 225 at the master arm end of the seal tube assembly is secured to threaded ring 219 and at the slave arm end of the seal tube assembly is secured to stop ring 207. Each of threaded rings 224 is provided with an annular groove in which is seated a wipe seal 226. Seal 226 may be formed from felt or other similar material and need only be tight enough to prevent the entry of solid foreign material into the space around the bellows and gas seal. Relative rotary movement occurs between the wipe seal 226 and the inner surface of the dust shield when the inner seal tube is rotated with respect to the outer stationary seal tube.

Gas under pressure is supplied to the T-connector 215 for the purpose of monitoring leakage through the rotary seals between the inner and outer seal tubes. In the event of failure of either of the rotary seals or either of the rubber seals, the harmless monitoring gas is all that passes the seal. The monitoring gas under pressure prevents migration of any noxious or otherwise undesirable substance from the environment of the slave arm into the protected environment of the operator.

A ring flange 227 is locked onto the slave arm end of the inner seal tube 202 and the flange 228 of the seal tube transfer plate casting is bolted or otherwise rigidly secured thereto. A gas impervious ring gasket 229 is interposed between the end face of the inner seal tube and the transfer plate casting. The outer periphery of flange 228 is provided with an annular groove 230 in which to fit an optional auxiliary wiping seal 231 of rubber or similar elastomer material and desirably having a ribbed configuration similar to seal rings 15. The auxiliary seal ring 231 is useful in maintaining a continuous seal when replacing a seal tube assembly which is installed in a barrier wall of less than usual thickness.

*Seal Tube Transfer Assembly (FIGURES 24, 26 and 27)*

The seal tube transfer plate casting is hollow and generally tubular and closed at the end opposite from flange 228. Its upper surface is slightly angularly inclined, downwardly from the flange, or stepped, to accommodate a plurality of double rotary seals to transmit the manipulator motions through the seal tube assembly. The transfer assembly or seal package for transmitting Y motion for conjoint annular movements of the master and slave arms is indicated generally at 232. The double rotary seal for transmitting Z motion or relative longitudinal movement of the master and slave arm is indicated generally at 233. The transfer assembly for the tong motion is indicated generally at 234. The seal package for transmission of azimuth motion is indicated generally at 235. The rotary transfer seal packages for transmitting elevation and twist motions are indicated generally at 236 and 237.

Each of the rotary transfer seals is identical in function and each is structurally similar to each other with minor variations in size, location, etc. The structure of the seal packages for transmitting the elevation and twist motions is shown in detail in FIGURE 29. Since this is representative of all of the seal packages, the others are not shown in detail. Space is provided at 238 for the installation of optional additional transfer assemblies where it is desired to introduce auxiliary motions such as, for example, locking means to hold the slave arm in place or means for locking the slave arm motion elements in place.

Each of the transfer assemblies 232–237 seats on an internal flange or shoulder in holes 239–244, respectively, drilled through the top surface of the transfer plate casting. Locating pin 171 seats in a similar hole 245. As shown in detail in FIGURE 29, each of the transfer assemblies is sealed with a gas tight seal in the transfer plate. In order to permit the use of a gas under pressure to monitor the seals of the several transfer assemblies, a gas tube 246 is cast into the seal tube transfer plate. A gas tube connector 247 is provided for the introduction of gas to tube 246 and the transfer assemblies. Gas may be supplied to connector 247 through T-connector 215 in the wall of the inner seal tube 202, or from an independent source. Gas tube 246 follows a circuitous route in order that it may be tapped to supply gas under pressure to each of the seals, as described hereinafter.

In order to supply gas to all of the transfer assemblies, a gas tube extension 248 connects with the main gas tube. The ends of gas tube 246 and the gas tube extension 248 are plugged at 249 and 250, respectively. The shoulders within holes 239–244 into which the motion transfer assembly 232–237 are seated are each provided with an annular gas passage groove and each is connected by an angularly drilled hole with the gas tube. Thus, a hole 251 communicating with gas tube 246 provides a gas port to the Y motion transfer assembly seated in hole 239. Similarly, there is provided a gas port 252 to the Z motion transfer assembly, a port 253 to the tong motion transfer assembly and ports 254 and 255 to the elevation and twist transfer assemblies 236 and 237, respectively. A gas port 256 is also provided to the seat at which locating pin 171 is fitted into the seal tube transfer plate. Because the seat for the azimuth motion transfer assembly is not positioned immediately adjacent to the path of the gas tube 246, a bypass is provided by which gas from the tong transfer assembly socket may pass through a port 257 which interconnects with a port 258 to the azimuth transfer assembly socket, as shown in FIGURE 28.

*Mounting of Slave Arm (FIGURES 1, 3, 24, 26 and 27)*

As should now be apparent, the slave arm transfer plate 20 is adapted to seat upon and be supported by the seal tube transfer plate 17. The slave arm assembly (FIGURES 1 and 3) is provided with a bail 259 by which the slave arm may be suspended by a hook 260 of a traveling crane or similar hoisting means for assembly and disassembly of the manipulator. Bail 259 is pivotally supported from the slave arm transfer plate casting 20 at 261. Each of the ends of the slave arm bail 259 is pivotally connected at 262 to a connecting rod 263 to a latch pin 264. It will be apparent that, as the slave arm assembly is lifted by the bail, the weight of the slave arm will tend to cause the bail loop to be moved in the direction toward the barrier wall to a vertical position. This movement of the bail will cause connecting rod 263 to retract the latch pins 264.

Positioned on opposite sides of the slave arm transfer plate 20 is a pair of parallel generally vertical tapered guide or locating fins 265. As the slave arm assembly is lowered into position over the projecting end of the seal tube assembly, the narrower tapered ends of the fins 265 engage the opposite sides of the seal tube transfer plate casting between a pair of guide pins 266 and 267 projecting out of the opposite sides of that casting. As the slave arm assembly is lowered further, the tapered edges of fins 265 engaging guide pins 267 urge the slave arm transfer plate into engaging position with the seal tube transfer plate. As the slave arm assembly is eased into place further, locating pins 268 on opposite sides of the slave arm transfer plate engage holes 269 on opposite sides of the seal tube transfer plate casting and assist in aligning the slave arm assembly with the seal tube assembly. A machined surface 266A on the bottom of the slave arm transfer plate bears against the top surface of pins 266 to complete the plane alignment of the slave transfer plate relative to the seal tube transfer plate.

As the slave arm transfer plate comes to rest on the seal tube transfer plate, a boss on the bottom surface of the slave arm transfer plate, comes to rest on the top surface of pin 171. As the hook of the hoisting means is disengaged from the bail 259, counterweights 270 on the arms of the bail force the bail to tilt away from the barrier wall and force the tapered latch pin 264 into tightening engagement with the bottom edges of guide pins 267. This draws the slave arm assembly down into tight operating engagement with the seal tube transfer plate and locks the slave arm assembly in place.

*Replacement of Seal Tube (FIGURES 1, 24, 25, 26, 27 and 28)*

In the event it is ever necessary to replace a seal tube assembly because of failure of any of the seal elements, this is done by disengaging the master arm and slave arm assemblies from the seal tube and pushing the seal tube assembly to be replaced through the wall tube by means of the replacement seal tube assembly, while at all times maintaining a tight effective seal between the environments of the master and slave cells. To facilitate this replacement, the seal tube assemblies are locked together and then pushed as a unit through the wall until the replacement seal tube assembly is properly positioned in the wall tube and the discarded seal tube assembly is free of the wall in the slave cell.

A supporting shoulder 271 is formed in the slave arm end of the replacement seal tube assembly. The replacement seal tube assembly is suitably supported, as in a sling or the like, and the slave arm end is inserted in the open end of the seal tube assembly to be replaced, with shoulder 271 resting on the inner surface of the master arm end of the inner seal tube 202. In order to maintain the two seal tube assemblies coupled together, a transverse rod is inserted through holes 272 in the opposite side walls of inner seal tube 202 at the master arm end thereof. This rod engages a bracket 273 on the slave arm end of the replacement seal tube assembly. Screws 274 permit adjustment of the coupling.

As the seal tube assembly to be replaced is pushed through the wall tube, a sling or other suitable supporting means is made available to receive the discarded unit. After the discarded seal tube assembly is pushed completely free from the wall tube, it remains supported at one end by the replacement seal tube assembly. However, the two seal tube assemblies are readily disengaged merely by tilting the discarded unit upwardly and lifting.

*Exemplary Seal Package (FIGURE 29)*

Referring now to FIGURE 29, there is shown in detail a double rotary seal transfer assembly coupled with the corresponding transfer units of the master arm and slave arm transfer plates. The transfer assembly, indicated generally at 236, is in the form of a cylindrical tubular housing 275 having an annular outwardly extending flange or integral collar 276 located intermediate of its ends. The housing 275 extends through the opening 243 in the top surface of the seal tube transfer plate casting 17 with flange or collar 276 resting upon an inwardly extending flange 277 in the opening 243 to support the housing.

A gas tight gasket is interposed between the mating surfaces of the flanges 276 and 277 to prevent the passage of noxious substances from the slave cell side of transfer plate 17 to the inside of the seal tube assembly. The upper face of inwardly extending flange 277 is provided with an annular groove 279. This groove communicates through port 254 with gas tube 246. The bottom face of outwardly extending flange 276 is provided with a corresponding annular groove 280. A channel 281 extends through the cylindrical housing wall to communicate the interior of the housing with the groove 280. An opening 282 in the gasket 278 permits the annular grooves 279 and 280 to communicate for gas flow. The housing 275 is held tightly in place in the opening in the seal tube transfer plate by means of a nut 283.

The bottom end of cylindrical housing 275 is provided with an inwardly extending annular flange 284. A seal ring 285, formed of steel or other suitable material, is supported within the housing on the shoulder formed by the flange. A gas tight gasket 286 is interposed between the seal ring and flange. A vertical shaft 287 extends through and beyond the ends of the housing 275. The shaft 287 is journaled for rotation on the longitudinal axis of the housing in a ring ball bearing 288 mounted within the inwardly extending flange 284. An inner cylindrical tube 289 is disposed within the housing 275. One end of the inner tube 289 bears against the top surface of the seal ring 285. A second or top seal ring 290 is supported within the housing 275 by the top end edge of inner ring 289. The upper end of shaft 287 is journaled in a ring ball bearing 291 supported in a retaining ring 292 which bears against the top surface of seal ring 290. A gas tight gasket 293 is interposed between the retaining ring and seal ring. A threaded collar 294 maintains constant pressure upon the elements within the transfer package housing in order to maintain the integrity of the gasketed seals.

A disc 295 is secured to shaft 287 intermediate of its ends within the housing 275 to rotate with the shaft. A first metal bellows 296 is secured to the periphery of disc 295 with a gas tight connection. The opposite end of bellows 296 carries a retaining ring 297 in which is supported a carbon seal ring 298 which bears against the lapped top surface of seal ring 285 to form a rotary gas tight seal. A further bellows 299 is secured with a gas tight connection to the upper periphery of disc 295. The opposite end of bellows 299 carries a retaining ring 300 which supports a carbon seal ring 301 whose flat lapped surface bears against the flat lapped lower surface of seal ring 290 to form a gas tight rotary seal. It will be noted that upon rotation of shaft 287 the bellows and the carbon seal rings carried by them will rotate with respect to the stationary seal rings within the transfer assembly housing. Other resilient mounting means may be substituted for the bellows to support one of the seal rings.

The integrity of the seals may be constantly monitored by means of gas under pressure introduced through tubing 286 and port 254 to the annular groove 279 in the supporting flange for the transfer assembly housing. The pressurized gas may pass through port 282 in gasket 278 to annular groove 280 in the lower surface of the flange 276 by which the transfer assembly housing is supported. The gas then passes through port 281 to the interior of the transfer assembly housing and through port 202 in the inner housing tube 289 to the chambers surrounding the bellows. Escape of gas is prevented by gaskets 278, 286 and 293 and the two rotary seals formed between the carbon seal rings 298 and 301 and seal rings 285 and 290, respectively. So long as the pressure on the monitoring gas remains substantially constant as observed on a gas pressure gauge the operator may be confident of the integrity of the gas seals. A substantial flow of the monitoring gas denotes the failure of one of the seals. It will be observed, however, that even in the event of the failure of a seal, the operator is in no danger of contamination by any noxious substance from the slave arm cell because the flow of the escaping monitoring gas is outward from the transfer assembly and effectively prevents migration of any noxious substance through the transfer assembly.

Motion Transfer Couplings (FIGURE 29)

The rotary transfer seal shaft 287 is rotated in response to movements of the manipulator arm transmitted through a coupling between the master arm transfer assembly and the seal tube transfer assembly occurring at the interface between the two. The lowermost end of shaft 287 is fitted with a retaining ring 303 and a face gear 304 keyed at 305 for rotation with the shaft. The bottommost face of gear 304 is provided with a ring of radiating teeth 306. An annular gear ring 307 is supported in the top of transfer drum 154. Gear ring 307 is provided with radiating gear teeth 308 to mesh with the teeth 306 of face gear 304.

It will be observed that the transfer drum 154 "floats" in the cavity 153 in the master arm transfer plate 19. The drum is journaled on bearing 309 for rotation about shaft 151 which is resiliently supported on a leaf spring 152. The whole assembly is retained within the cavity by means of a plate 310 secured over the cavity on the bottomside of the master arm transfer plate. This resilient mounting of the transfer drum facilitates coupling when the master arm transfer plate and seal tube transfer plate are brought into contact.

The face gear 304 on the seal tube transfer assembly is provided with a projecting tapered hub which performs a preliminary locating function by mating with a tapered recess 312 in the master arm transfer drum during the initial elevation of the entire master arm transfer plate by means of the elevating mechanism already described. The final mating of the gear teeth 306 with gear teeth 308 is accomplished as a result of the further elevation of the master arm transfer plate, and the resiliency of spring 152 urging the gear teeth into mating contact.

Thus, it is apparent that, as drum 154 is rotated in response to movement of tapes 70 and 70A, this rotation is transmitted to the seal tube transfer assembly shaft 287. The rotation of the seal tube transfer assembly shaft 287 in turn causes the rotation of the corresponding slave arm transfer mechanism in order to transmit the motion of the master arm to the slave arm. The upper end of shaft 287 is provided with a retaining ring 313 and a face gear 314 keyed at 315 for rotation with the shaft. The upper exposed face of gear 314 is provided with a ring of radiating teeth 316. Gear teeth 316 mesh with corresponding radiating teeth 317 in the exposed face of a gear ring 318 supported in a slave arm transfer drum 319. Slave arm transfer drum 319 is journaled by bearing 320 to rotate with respect to a shaft 321 bearing against a leaf spring 322. The drum 319 and associated mechanism is fitted with a relatively loose fit in a cavity 323 formed in the lower face of the slave arm transfer plate casting 20 so as to "float" therein to facilitate coupling with the seal tube transfer assembly.

The slave arm transfer drum assembly is retained in the cavity 323 by means of a retaining ring 324 whose inner surface is provided with a ring of radial locking teeth 325 whose function is to lock the slave arm transfer assembly in the position in which it is at the time of disengagement of the coupling with the seal tube transfer assembly. It will be noted that the teeth 317 on gear ring 318 are wide enough to engage alternately the teeth 316 of the coupling face gear 314 or the locking teeth 325. Spring 322 causes engagement between the locking teeth 325 and transfer assembly gear teeth 317 except when these teeth are pushed out of engagement by pressure of the seal tube transfer assembly gear teeth in mating contact with the slave arm transfer assembly gear teeth.

Face gear 314 is provided with a projecting tapered hub 326 which performs a preliminary locating function as it mates with tapered recess 327 in the slave arm transfer drum. As the slave arm transfer plate is lowered onto the seal tube transfer plate and these parts come together, the fitting together of the tapered hub with the tapered recess in the "floating" drum 319 aligns the resiliently mounted shaft 321 with the seal tube transfer assembly shaft 287 and as the slave arm transfer plate is lowered still further, the gear teeth 317 are disengaged from the locking teeth 325 as they become engaged with the teeth 316 of face gear 314 to complete the coupling between the transfer assemblies.

As the slave arm transfer drum 319 is caused to rotate in response to the rotary motion of the master arm transfer drum transmitted through the seal tube transfer unit, tapes 328 and 328A which are wound around the upper and lower grooves of the drum are caused to either become wound or unwound to transmit motions to the slave arm corresponding to those of the master arm. An idler 329 is shown journaled on the top of the slave arm transfer plate to guide tape 330 for transmission of vertical longitudinal motion to the slave arm boom tube (FIGURE 35). A further idler 331 is shown which guides cable 332 for transmission of azimuth motion to the slave arm in response to corresponding movement in the master arm.

Alternative Seal Package (FIGURE 30)

In FIGURE 30 there is shown an alternative form of rotary seal construction. The structure of the housing, shaft, bearings, etc., are the same as already described with reference to FIGURE 29. In the modified form of rotary seal structure a ring 333 is soldered or welded or otherwise secured to shaft 287 intermediate of its ends with a gas tight connection. In order to permit monitoring of the solder or weld seal the shaft 287 is undercut at 287A and a gas port 333A is provided in ring 333. The opposite faces of the seal ring 333 are lapped to a fine finish. A bellows 334 is attached with a gas tight connection to a ring 335 which is sealed in the housing by virtue of the pressure of inner tube 289 bearing against gasket 286 and internal shoulder 284 of the housing. The opposite end of bellows 334 carries a retaining ring 336 in which is supported a carbon seal ring 337. The lapped surface of the carbon ring 337 remains stationary while the bottom lapped surface of seal ring 333 which it engages is rotated. The identical bellows structure is duplicated in the upper portion of the transfer assembly housing. Instead of the bellows as shown, equivalent resilient mounting means may be used to support one of the seal rings.

In this modified form of construction, the rotary seal surfaces are at the interface between the opposite surfaces of seal ring 333 and the carbon seal rings 337, but the carbon seal rings remain stationary while the seal ring 333, formed of steel or other suitable material, is rotated. The modified form of package may be subjected to gas under pressure to monitor the integrity of the seal, as heretofore described.

*Alternative Heavy Duty Coupling*
*(FIGURES 31, 32 and 32A)*

In FIGURES 31 and 32, there is shown a modified form of motion transfer assembly having a heavy duty coupling between the master arm and the slave arm transfer drums and the seal tube transfer assembly. This modified heavy duty transfer assembly is especially adapted to the transmission of "Y" motion where the lifting of heavy loads might otherwise cause the resiliently mounted transfer drums and attached gears to cant and slip because of becoming disengaged from the seal tube transfer assembly gears.

With minor exceptions, as noted, the structure of the seal tube transfer assembly is virtually identical to that described with respect to FIGURE 29. However, the housing 275A is provided with an integral flange or sleeve 338 spacing the flange 276A outwardly from the housing body so as to fit in the larger diameter opening 239 provided in the seal tube transfer plate casting 17 for transfer of Y motion. This necessitates the use of a larger diameter gasket 278A and a larger diameter nut 283A. Because of the heavier housing, gas port 281A is necessarily longer. Annular gas passage grooves 279A and 280A are likewise of greater diameter. Groove 279A communicates directly by means of gas port 251 with gas tube 246. Face gears 304A and 314A at the master arm and slave arm ends of seal tube rotary transfer shaft 287 are of slightly larger diameter.

A double grooved Y motion transfer drum 155A is journaled by means of ring ball bearing 339 to rotate with respect to a tubular shaft 340 in a generally horizontal plane. Shaft 340 is rigidly secured to the master arm transfer plate casting by means of a nut 341. Drum 155A is recessed in a cavity 342 in the master arm transfer plate which is partially covered by an annular retainer ring 343 which functions to retain the master arm coupling gear.

The transfer drum 155A is formed with a cavity 344 in its top surface. A coupling plate 345 is rigidly secured to the drum at the bottom of the cavity. The bottom coupling plate 345 is provided with a pair of aligned rectangular lands 346. An intermediate coupling plate 347 is disposed on top of bottom coupling plate 345. The bottom surface of coupling plate 347 is provided with a pair of aligned rectangular channels 348 adapted to engage the lands 346 for limited sliding movement along the axis of alignment of the lands and channels, while held against movement in any other direction by virtue of a tight fit between the lands and channels. A second pair of channels 349 is provided in the top face of the intermediate coupling plate 347.

Channels 349 on the top base of plate 347 are rectangular and are aligned along an axis perpendicular to the axis of alignment of the channels 348 on the bottom face of the plate. A face gear 350, having an annular ring of radial teeth 351 on its upper face adapted to mesh with the teeth 306A of face gear 304A of the seal tube transfer assembly, has a pair of aligned slide blocks 352 projecting from the bottom surface. The slide blocks 352 are adapted to slide in channels or guideways 349 on the top surface of the coupling plate 347 so as to permit limited movement in the direction of the axis of the channels.

Because the face gear is supported in the intermediate coupling plate which may move for a limited distance in a direction perpendicular to the direction of sliding of the face gear it will be seen that the face gear may move to a limited extent in both directions relative to the transfer assembly drum. Thus, when the tapered hub 311A of the seal tube transfer assembly face gear 304A engages the tapered recess 353 of tubular shaft 340 the face gear 350 is permitted limited movement to facilitate mating of the gear teeth, but without the possibility of tilting or canting. The teeth of face gear 350 are resiliently urged into engagement with the teeth 306A of face gear 304A by means of a plurality of coil springs 354 disposed in openings 355 in the intermediate coupling plate 347. The vertical movement of gear 350 in response to the pressure of springs 354 is limited by the retaining cover plate 343. The extent of vertical movement is less than the depth of channels 349.

The same transfer drum and heavy duty coupling structure is duplicated in the slave arm transfer plate, as shown in FIGURE 31. The transfer drum and associated mechanism is housed in cavity 356 in the top surface of the slave arm transfer plate casting 20. The tubular shaft 340 is rigidly supported from a cover plate 357 being secured thereto by means of a nut 358. A modified form of retaining ring 324A having locking teeth 325A is situated in the bottom of cavity 356 to lock the slave arm transfer mechanism when the slave arm transfer plate is lifted from the seal tube transfer plate. While the heavy duty positive coupling means finds its greatest utility in transferring Y motion, this form of coupling may, of course, be used for other motions, if desired.

It will be understood that with respect to each of the Y, Z, tong, azimuth, and elevation and twist motions a double rotary seal is provided. That seal or transfer assembly is provided with means at one end for coupling with the rotary transfer assemblies of the master arm and at the other end for coupling with corresponding rotary transfer assemblies of the slave arm.

As previously described, and as is apparent from the schematic representations of the means by which the individual movements and motions of the master arm are transmitted to the slave arm, the elements by which motion transfer is accomplished find their corresponding elements duplicated in virtual mirror image in the slave arm assembly. For this reason, it is unnecessary to burden the application by repetition of corresponding illustrations and description. It will be noted, however, that the slave arm transfer plate is located substantially closer to the slave arm pivot than is the corresponding master arm transfer plate to the master arm pivot. This permits the use of substantially shorter tapes and cables in the slave arm assembly. It will be noted, however, that the extent of movement of each of the tapes and cables will be the same in both the master arm and slave arm assemblies.

*Extended Y Motion (FIGURES 1, 2, 16 and 17)*

It will be observed that movement of the master arm on its pivot 25 in the direction toward the barrier wall 13 is limited by the barrier wall itself. The slave arm is subject to no such limitation. In order to extend the reach of the slave arm in its cell, means are provided to rotate the slave arm on its pivot 29 independently of corresponding rotation of the master arm upon its pivot. This is accomplished by means of an electrical screw jack 359 (FIGURES 1, 2 and 17) pivotally connected at 360 to the right counterweight arm 114 and pivotally connected at 361 to fixed sleeve 110 adjacent the top of the master arm trunk tube. Extension or retraction of the jack means 359 will cause relative movement about the axis of pivot 25 between the counterweight arms 114 and Y motion disc 120 on the one hand, and collar 110, arms 111 and counterweight arms 115 on the other. Assuming that the master arm is held stationary by the operator, this relative movement is transferred through the Y motion transfer system to the slave arm to cause the slave arm to be extended forwardly into the slave cell. By this means, the master and slave arm may be caused to be non-parallel with respect to one another while in the same plane. Simultaneous lateral relative rotation of the slave arm out of the plane of the master arm may be accomplished by means of the structure described in connection with FIGURES 21 to 23.

The power for jack means 359 is supplied through a variable transformer 362 mounted on the left counterweight arm 114. Control of the variable transformer to vary the voltage to the motor of the electrical jack and thus vary its speed is controlled by means of a flexible cable 363 extending through a rigid tube 364 and terminating in a ring handle 365 located at the bottom end of the master arm trunk tube within easy reach of the operator. The electrical jack 359 and the lateral rotation jack means 201 are both controlled through appropriate switch means 366 on the master arm trunk tube and relay means 367 on the left counterweight arm 114.

X Motion of Arms (FIGURES 25 and 26)

X motion or movement of the master and slave arms together, pivoted on the longitudinal axis of the wall tube 14, is accomplished by the relative rotation between inner seal tube 202 and outer seal tube 203 on bearings 204. The rotary bellows seals at opposite ends of the seal tube assembly prevent the migration of material between the slave and master cells during this rotation.

Y Motion of Arms (FIGURES 1, 2, 3, 11, 18, 18A, 19, 20, 24, 26, 27 and 33)

The means by which the master arm and slave arm of the manipulator are interconnected through a rotary seal transfer assembly for Y motion or conjoint angular movement about the pivots at the ends of the arms is shown schematically in FIGURE 33. It will be seen that one cable 121 is secured to a master arm transfer drum 155 and is guided by idlers 156 and 133 to the grooved disc 120 to which the opposite end is secured. Another cable 123 extends around the transfer assembly drum 155 in the opposite direction and is guided by idler 133 around disc 120 in the opposite direction and its free end is secured. Disc 120 is mounted to rotate about the master arm pivot 25. As the master arm is moved on its pivot so that the handle at its lower end is moved away from the barrier wall, the disc 120 will be moved in a counterclockwise direction, as viewed in FIGURE 33. This will cause simultaneous tensioning of cable 123 and slackening of cable 121. This action, transmitted along the cables, will cause drum 155 to be rotated in a clockwise direction. As cable 123 under tension is unwound from the drum 155 the slack in cable 121 will be taken up simultaneously as that cable is wound about the drum.

The rotary movement of drum 155 in a clockwise direction is transferred through a double seal rotary transfer assembly, indicated schematically at 232, and having structure generally as described in connection with FIGURES 29 to 31, to a corresponding slave arm transfer drum 368. The transfer drum 368 located in the slave arm transfer plate will be rotated in the same direction, that is, clockwise in the example given. This will cause simultaneous tensioning of cable 369 and slackening of cable 370. Cables 369 and 370 extend around drum 368 in opposite directions. Cable 369 extends from the drum 368 over an idler 371 to grooved disc 372 mounted to pivot at the slave arm pivot 29. The free end of cable 369 is secured to disc 372 at 373.

As tension is exerted by drum 368 on cable 369 that tension is transmitted through the cable to rotate disc 372 on its pivot. This movement of disc 372 will cause cable 370, which is guided by idler 374 to extend around disc 372 in the opposite direction, and is secured at 375, to be subjected to tension by rotation of the disc to take up the slack created by unwinding of cable 370 from drum 368. Since disc 372 is mounted to rotate on pivot 29 with the slave arm, the slave arm will be rotated on its pivot through an angle equal to the angle of rotation of the master arm.

The action as described will be the same whether or not the slave arm and master arm have been angularly displaced through operation of the jack means 359. The angle through which the slave arm is pivoted on its pivot 29 will be equal to the angle through which the master arm is rotated on its pivot 25. When the slave arm is displaced angularly with respect to the master arm through operation of jack 359, this extending motion is transferred through the rotary seal to the slave arm in the manner described.

Boom Tube Counterbalance (FIGURES 1 to 15, 34 and 38)

The master arm boom tube 22 fits telescopically within master arm trunk tube 21, as described and shown. In order that the boom tube will remain in any position relative to the trunk tube and may be retracted or extended with minimum exertion on the part of the operator, it is counterbalanced, as shown schematically in FIGURE 34. At the same time, the length of the paths of travel of tapes and cables associated with the master arm boom tube and moved with that tube is maintained uniform by compensating for the distance through which the boom tube is moved by means of the half speed carriage assembly.

Counterweight 52 is suspended by means of tapes 56 and 57 which pass over fixed pulleys 103 and 104, respectively, in the upper pulley bank 101 at the top of the master arm trunk tube. The ends of tapes 56 and 57 are secured to shaft 92 of the half speed carriage assembly 85, which moves longitudinally within the master arm trunk tube in the opposite direction and at one-half the speed of the master arm boom tube. A tape 45 is attached at one end to a stud 81 on the full speed carriage assembly 73 which is mounted at the top of the master arm boom tube for longitudinal movement therewith. Tape 45 extends downwardly and around a fixed pulley 46 on the base 31 of the azimuth sub-assembly 30 at the bottom end of the master arm trunk tube. Tape 45 then extends upwardly and around a pulley 51 fixed to the counterweight 52 and downwardly again where its opposite end is fixed to a stud 44 carried by the azimuth sub-assembly base plate. Elevation and twist tape 70, 70A, 71 and 71A all extend over the half speed carriage pulley bank in their paths between the fixed handle end of the boom tube and the fixed trunk tube pulley bank (FIGURE 38). These tapes provide the counterforce which enables the half speed carriage to remain suspended in the upper portion of the trunk tube.

As the boom tube is lowered, that is, extended out of the trunk tube, it moves at a given rate with respect to the fixed trunk tube. At the same time, the half speed carriage 85 moves in the same direction but at one-half the speed. The counterweight, which travels along the outside of the trunk tube, moves in the opposite direction and at one-half the rate of speed of movement of the boom tube. The slave arm is counterbalanced in the identical manner.

Z Motion of the Arms (FIGURES 1 to 7, 11 to 13, 15 to 20, 24, 26, 27 and 35)

The transfer of the extending and retracting movement or Z motion of the master boom tube to the slave boom tube is simultaneous with, but independent of, movement of the counterbalance system. One tape 50 extends from a stud 84 (fixed to the full speed carriage assembly 85 which is mounted on the top of the master arm boom tube) downwardly over fixed pulley 48 carried by the azimuth sub-assembly (which is fixed to the bottom end of the master arm trunk tube). Tape 50 then passes upwardly over one groove of double pulley 128

(of the pivot pulley bank 126) and is guided by idler 158 to master arm transfer drum 157. Another tape 50A is secured to drum 157, passing around it in the opposite direction. Tape 50A is guided over idler 138 around the other groove of pulley 128 (but in the opposite direction), up and over fixed pulley 105 (in the upper pulley bank fixed at the top of the master arm trunk tube) and downwardly to the top of the boom tube where the tape is attached to a stud 83.

As the master arm boom tube is lowered, that is, extended from the trunk tube, tape 50A is subjected to increased tension which is transmitted to the transfer drum 157 to cause it to rotate in a counter-clockwise direction, as viewed in FIGURE 35. This causes an unwinding of tape 50A from the drum and, because tape 50 is wrapped around the drum in the opposite direction, it becomes wound further about the drum to take up the slack in that tape.

The same counterclockwise rotation is imparted to slave arm transfer drum 376 through a seal transfer assembly, indicated generally at 233. When transfer drum 376 is rotated in a counterclockwise direction, tape 330A, one end of which is attached to the drum, is wound further about the drum. This tension exerted on tape 330A is transmitted through the tape, which passes around one groove of double pulley 377 of a slave arm pivot pulley bank, downwardly and around pulley 378 supported on the slave arm azimuth sub-assembly, and upwardly to the slave arm full speed carriage, indicated generally at 379, where it is attached to a stud 380. This tension exerted by tape 330A at the top of the slave arm boom tube causes that portion of the slave arm to become extended at the same rate and for the same distance as the master arm boom tube is moved by the operator.

The downward movement of the slave arm boom tube in turn exerts tension on tape 330, one end of which is attached to stud 381 of the slave arm full speed carriage 379. This tension is transmitted through the tape 330, which passes over pulley 382 in the upper pulley bank (fixed at the top of the slave arm trunk tube), and then around the other groove of double pivot pulley 377 and in the opposite direction. Tape 330 is guided by idlers 383 and 329 to the transfer drum 376 around which it extends in the opposite direction from tape 330A and to which its end is secured. Thus, as tape 330A is wound further about drum 376 as it rotates in a counterclockwise direction, tape 330 is unwound to the same extent.

*Tong Motion of the Arms (FIGURES 1 to 3, 8 to 11, 14, 16 to 20, 24, 26, 27 and 36)*

As shown schematically in FIGURE 36, the squeezing motion of the operator on the handle means 23 of the master arm is transmitted to the tong means 28 on the slave arm. As fully described in the aforementioned Goertz et al patent, squeezing of the handle 23 through direct linkage exerts tension on tape 72 which is transmitted through the tape. Tape 72 passes over pulley 100 carried in the half speed carriage assembly 85 (which is movable within the master arm trunk tube), down and around pulley 67 (whose location is fixed as part of the trunk tube pulley bank), up and over pulley 131 (in the master arm pivot pulley bank) to transfer drum 159. This tension transmitted through the tape causes the tape to unwind from the drum and causes the drum to be rotated against the tension of spring 160 in a clockwise direction. This clockwise rotation is transmitted through the double seal transfer assembly, indicated schematically at 234, to a slave transfer drum 384.

A tape 385 is wound about drum 384 in the opposite direction from which tape 72 is wound about drum 159. Thus, when drum 384 is rotated in a clockwise direction, the tape 385 is wound further about the drum. The tension exerted on tape 385 is transmitted through the tape which passes over a pulley 386 (adjacent the slave arm pivot 29) and down and around a pulley 387 (located in the slave arm trunk tube). Tape 385 then passes up and over pulley 388 (supported in the slave arm half speed carriage, indicated generally at 389) and, thence, downwardly to the tong mechanism 28 at the end of the slave arm boom tube. Through direct linkage, as disclosed in the aforementioned Goertz et al. patent, the tension transmitted by tape 385 causes the tong elements to close in order to grasp an object to be acted upon.

When the operator releases the handle means spring 160 automatically reverses the direction of rotation of drum 159 to wind up tape 72 and take up any slack. This counter rotation is transmitted through the sealed transfer assembly to rotate drum 384 to release the tension on tape 385. Spring means in the tong assembly then open the tongs.

*Azimuth Motion of the Arms (FIGURES 1 to 7, 11, 15 to 17, 18 to 20, 24, 26, 27 and 37)*

The manner in which rotation of the master arm boom tube about its longitudinal axis is transmitted to cause a corresponding rotation of the slave arm boom tube about its longitudinal axis is illustrated schematically in FIGURE 37. One end of cable 40 is wound in one direction around pulley or drum 32 of the master arm azimuth assembly. This cable is guided around pulley 41 on the azimuth sub-assembly, upwardly and around one groove of double pivot pulley 127, to master transfer drum 162 to which the other end of the cable is attached. Cable 42 extends around pulley or drum 32 (of the azimuth sub-assembly 30) in the opposite direction and extends around pulley 43 (located on the azimuth sub-assembly) upwardly and over pulley 107 (in the upper pulley bank on the top of the master arm trunk tube). Cable 42 then extends down and around the other groove of double pivot pulley 127 (and in the opposite direction from cable 40), over idler 137 and around idler 163 to drum 162 (around which it extends in the direction opposite from cable 40).

If the master arm boom tube is rotated in a clockwise direction, as viewed in FIGURE 37, this has the effect of winding a greater length of cable 40 about the drum and unwinding an equivalent length of cable 42. This movement is transmitted through the cables to the transfer drum 162 where cable 40 unwinds to rotate that drum also in a clockwise direction and cable 42 is wound about drum 162 to the same extent that it is unwound from drum 32. This clockwise rotation of drum 162 is transmitted through the double seal transfer assembly, indicated schematically at 235 to a slave transfer drum 390.

As drum 390 is rotated in a clockwise direction, cable 391, one end of which is attached to drum 390, is wound about the drum exerting tension on the cable. This tension is transmitted through the cable which follows a path over one groove of double pivot pulley 392, downwardly and around a guide pulley 393 to a double grooved drum or pulley 394 (forming part of the slave arm azimuth sub-assembly, indicated generally at 395). The end of cable 391 is secured to the drum 394 and the tension transmitted through the cable causes the cable to unwind to rotate drum 394 in a clockwise direction and, at the same time, to rotate the slave arm boom tube around the longitudinal axis of the slave arm in the same clockwise direction.

As cable 391 unwinds from drum 394, cable 332 (which is wound around the drum in the opposite direction) is wound further onto the drum. The end of cable 332 is attached to the drum and the winding of the cable around the drum applies tension to the cable which is transmitted through the cable as it passes around guide pulley 396 (on the slave arm azimuth sub-assembly 395) upwardly to pulley 397 (in the pulley bank located at the top of the slave arm trunk tube). Cable 332 then extends downwardly and around the other groove of double pivot pulley 392 (and in the opposite direction from cable 391) over and around idlers 398 and 331 to drum 390, around which it is wrapped in the direction opposite from cable 391. Thus, as cable 391 is wound further about drum 390, cable 332 is unwound to the same extent.

*Elevation and Twist Motions of the Arms (FIGURES 1 to 3, 8 to 11, 14 to 20, 24, 26, 27, 29 and 38)*

The system by which elevation and twist motions are transmitted from the handle 23 to the tong 28 is illustrated schematically in FIGURE 38. One end of tape 70 is secured to a drum 399 associated with the handle mechanism which is rotated in response to manipulation of the handle by the operator through direct gearing, as described in the aforesaid Goertz et al. patent. As drum 399 is rotated in a counterclockwise direction, as viewed in FIGURE 38, tape 70 is wound about that drum. This exerts tension upon the cable which is transmitted through the cable in its path up and over pulleys 96 (in the half speed carriage 85), down and around pulley 63 (located in the trunk tube), up and around pulley 108 (located in the pulley bank at the top of the trunk tube), down and around one groove of double pivot pulley 128, and around idler 165 to master transfer drum 154.

The structure of drum 154 is shown in detail in FIGURE 29. The end of cable 70 is attached to the drum. The force exerted through the tape causes drum 154 to rotate in a clockwise direction. As transfer drum 154 is rotated in a clockwise direction, force is exerted on tape 70A which is wound further onto the drum. The force is exerted through the tape along its path past pulley 139, around double pivot pulley 128 (in the opposite direction from tape 70), down and around trunk tube pulley 64, up and over half speed carriage pulley 97 to drum 399, to which the end of tape 70A is secured. As drum 399 rotates in a counterclockwise direction to wind tape 70 onto it, tape 70A is unwound to the same extent.

The clockwise rotation of master transfer drum 154 is transmitted through a double rotary seal, indicated schematically at 236, to slave transfer drum 319, which is caused to rotate in the same clockwise direction. As this occurs, tape 328 is caused to be wound onto the drum exerting tension on the tape which is transmitted through the tape along its path of travel. Tape 328 extends around idler 400, under and around one groove of double pivot pulley 401, up and over pulley 402 (in the upper bank at the top of the slave trunk tube), down and around slave arm trunk tube pulley 403, up and over pulley 404 (on the slave arm half speed carriage 389) and thence, down to drum 405 of the tong mechanism to which the end is secured. The force transmitted by tape 328 causes drum 405 to be rotated in a counterclockwise direction corresponding in rate and extent of rotation to the rotation of drum 399 on the master arm.

Tape 328A extends around drum 405 in the opposite direction from tape 328. The end of tape 328A is attached to the drum. Thus, when drum 495 is rotated in a counterclockwise direction (caused by the unwinding of tape 328) tension is exerted by the drum 405 on tape 328A to wind that tape further onto drum 405. This force is transmitted by the tape along its path of travel up and over pulley 406 (on the half speed carriage 389), down and under pulley 407 (located in the wall of trunk tube), up and over pivot pulley 401 (in the other groove and in the opposite direction from tape 328), under idler 408 to drum 319 where the tape is unwound to the same extent that it is wound on drum 405 in the tong mechanism.

Similarly, the handle mechanism 23 includes a further drum 409 around which tape 71 is wound and to which its end is secured. As drum 409 is rotated in a counterclockwise direction in response to manipulations of the handle by the operator through direct gearing, the tape 71 is caused to be wound about the drum thereby exerting tension on that tape. This force is transmitted by the tape 71 along its path up and over trunk tube pulley 98, up and over pulley 98 (in the half speed carriage 85), down and under trunk tube pulley 65, up and over pulley 109 (in the upper pulley bank at the top of the master trunk tube), down and around one groove of double pivot pulley 129 and around idler 166 to master transfer drum 164 to which the end of tape 71 is secured.

The force exerted by tape 71 causes that tape to unwind from drum 164 while, at the same time, causing tape 71A to be wound further onto drum 164. The force exerted by the rotation of drum 164 upon tape 71A is transmitted through the tape along its path under idler 140, over pivot pulley 129 (in the other groove and in the opposite direction from tape 71), down and under trunk tube pulley 66, up and over pulley 99 (on the half speed carriage 85), and down to drum 409, to which the end of tape 71A is attached. The tension on tape 71A causes it to unwind from drum 409 to an extent equal to that wound about the transfer drum 164.

The counterclockwise rotation of drum 164 is imparted through the double rotary seal, indicated schematically at 237, to a slave transfer drum 409 which is caused to rotate in the same counterclockwise direction. This exerts a pull on tape 410 which is transmitted along the path of the tape around idler 411, under and around pivot pulley 412, up and over pulley 413 (at the top of the slave arm trunk tube), down and around trunk tube pulley 414, up and over pulley 415 (in the half speed carriage 389), and thence down to drum 416 to which the end of the tape is secured.

The pull exerted against tape 410 by transfer drum 409 causes the tape to wind around that drum and to unwind from drum 416 to the same extent. This causes drum 416 in the tong mechanism to rotate in a counterclockwise direction corresponding to the counterclockwise rotation of drum 403 in the handle of the master arm. This rotation of drum 416 exerts a pull against tape 410A exerted through the tape in its path of travel upward and over pulley 417 (of the half speed carriage 389), downward and under pulley 418 (located in the wall of the slave arm trunk tube), up and over double pivot pulley 412 (in the groove and in a direction opposite from tape 410), and under idler 419 to drum 409 to which the end of the tape is attached. The pull exerted upon tape 410A causes that tape to unwind from the drum 409 as the drum rotates in a counterclockwise direction.

Each of the motion transfer systems has been described in connection with the schematic illustrations as moving in a single direction. The operation of the systems to accomplish movement in the opposite direction will be readily apparent. It will also be apparent that, in actual operation of the manipulator device, two or more of the motion systems will be in simultaneous but independent operation.

By means of use of the present invention, mechanical motions are transferred mechanically through a sealed barrier in order to shield and protect the manipulator operator from any harmful effects of the environment of the slave arm. The integrity of the mechanical seals may be monitored at all times by means of gas under pressure. The fact of maintenance of the desired tight seal can be continuously observed by appropriate metering and alarm instrumentation between the gas pressure source and the seals. In the event of seal failure, not only may this fact be made immediately apparent, but the flow of gas in each instance is outward from the inside of the seal into the space on one side of the barrier wall or the other. There is no opportunity for flow through the seal mechanism of contaminating substances from one side of the barrier wall to the other.

The manipulator has been described and illustrated as incorporating double seals in all locations where motions are transmitted through a barrier between the differing environments of the master and slave cells. The use of double seals is a necessity where gas monitoring is necessary or desirable. It will be readily understood, of course, that effective sealing can be accomplished by use of a single seal in each location. Thus, the seal tube and each of the seal packages can be constructed so as to incorporate but a single rotary seal. At the same time, means for gas monitoring may be omitted.

The relative positions of the master arm assembly and the slave arm assembly with respect to the seal tube assembly may be reversed simply by transposing the handle or gripper means from the master to the slave and the tongs from the slave to the master. The overall disposition of parts would otherwise be as shown in FIGURE 1 with the exception that the area to the right side of the barrier wall is then the operators cell and the open end of the seal tube is in communication with the environment of the slave cell.

It is thus readily apparent that the seal tube transfer plate may, if desired, be located at either end of the seal tube assembly, or even at some intermediate location between the ends. The plane of the barrier wall through which the rotary seal extends may be varied according to individual requirements. The axes of the transfer shafts likewise may be varied according to individual requirements or preferences.

Although the manipulator of this invention is illustrated and described with reference to its most conventional mode of installation in which the seal tube assembly extends horizontally through a vertical wall, it will be apparent that other modes of installation are possible. The manipulator may be adapted for installation through either horizontal or inclined barrier walls. The seal tube assembly may thus be horizontal or vertical or inclined depending upon the requirements of the installation in which the manipulator is used.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A remote control master-slave manipulator adapted for operation through a barrier wall separating different environments, said manipulator comprising a pivoted master arm assembly adapted to be positioned on one side of a barrier wall, a pivoted slave arm assembly adapted to be positioned on the other side of the barrier wall, and a seal tube assembly adapted to extend through the barrier wall and be sealed therein, said master arm assembly and said slave arm assembly being pivoted on independent axes which are perpendicular to the longitudinal axis of said seal tube assembly, said seal tube assembly including a closed wall member separating the environments, a plurality of rotary mechanical seals extending through the closed wall of said seal tube assembly and interconnecting said master and slave arm assemblies, said rotary mechanical seals having spaced apart independent axes, one end of each of said rotary mechanical seals being responsive to manipulator motions of the master arm, said rotary mechanical seals being adapted to transmit said motions to the opposite end of said rotary mechanical seals, manipulator movements in the slave arm being responsive to rotation of said rotary mechanical seals.

2. A remote control master-slave manipulator according to claim 1 further characterized in that said rotary mechanical seals comprise a plurality of sealed transfer shafts each extending through the closed wall of the seal tube assembly and each journaled for rotation therein, coupling means on opposite ends of said transfer shafts, a plurality of rotary master shafts each adapted for rotation with one of said transfer shafts, coupling means on each of said master shafts adapted to couple with one end of one of said transfer shafts, means adapted to rotate said rotary master shafts responsive to movements of the master arm, a plurality of rotary slave shafts each adapted for rotation with one of said transfer shafts, coupling means on each of said slave shafts adapted to couple with one of said transfer shafts, and means connected to said rotary slave shafts adapted to produce movement in the slave arm responsive to rotation of said slave shafts through the rotary mechanical seals.

3. A remote control master-slave manipulator according to claim 2 further characterized in that each of said rotary master and slave shafts at the ends opposite from the coupling means is provided with drum means, and each of said drum means is associated with linear movement transmission means, whereby linear motion is converted to rotary motion on one side of said rotary mechanical seal and reconverted to linear motion at the other side thereof.

4. A remote control master-slave manipulator according to claim 3 further characterized in that each of said drum means is associated with a pair of opposed linear movement transmission means each extending about the periphery of the drum in an opposite direction, a pivot pulley bank associated with each of the pivots of said master arm and slave arm assemblies, each of said pivot pulley banks including a plurality of double grooved pulleys, one of said pair of linear movement transmission means associated with one of said drum means extending around one grove of a pulley in one direction and the other of said linear movement transmission means associated with said same drum means extending about the other grove of said same pulley in the opposite direction, whereby variations in tension of said linear movement transmission means due to movement of said master and slave arm assemblies on their pivots may be compensated.

5. A remote control master-slave manipulator according to claim 3 further characterized in that said master, transfer and slave shafts are axially aligned, each of said drum means is provided with a radially toothed face gear coupling means and each end of each of said transfer shafts is provided with a mating radially toothed face gear, said face gears associated with said master and slave shafts being resiliently mounted for mating engagement with said transfer shaft face gears.

6. A remote control master-slave manipulator according to claim 1 further characterized in that each of said rotary mechanical seals comprises a housing, a shaft journaled in said housing for rotation relative thereto, at least one pair of mating seal ring surfaces enclosed within the housing, one of said seal ring surfaces being integral with a seal ring surrounding said shaft and resiliently supported relative thereto, the other of said mating seal ring surfaces being integral with a seal ring surrounding said shaft and fixed against movement relative to said shaft in a direction along the longitudinal axis thereof, and means for rotating one of said mating seal ring surfaces with said shaft relative to the other mating seal ring surface.

7. A remote control master-slave manipulator according to claim 6 further characterized in that each of said rotary mechanical seals includes two pair of seal ring surfaces, said seal rings are gas tight, and means are provided for introducing gas under pressure to said mechanical seal housing in the space betwen said housing wall and said mating seal ring surfaces for monitoring the integrity of the seals between said mating seal ring surfaces.

8. A remote control master-slave manipulator according to claim 6 further characterized in that said resiliently supported seal rings are fixed against rotation relative to said shaft and said mating seal ring surfaces are secured to said shaft for rotation therewith.

9. A remote control master-slave manipulator according to claim 1 further characterized in that said seal tube assembly includes an outer tube adapted to be made stationary with respect to the barrier wall through which it extends, an inner tube extending through said outer tube and journaled for rotation relative thereto, at least one pair of mating seal ring surfaces within said seal tube assembly, one of said seal ring surfaces being integral with a seal ring surrounding said inner tube and resiliently supported for limited movement in a longitudinal direction along the axis of said tube, the other of said mating seal ring surfaces being integral with a seal ring surrounding said inner tube and fixed stationary against longitudinal movement, one of said seal ring surfaces being mounted for rotation with said inner tube, the other of said mating seal ring surfaces being stationary against rotation.

10. A remote control master-slave manipulator according to claim 9 further characterized in that said seal tube includes two pair of seal ring surfaces, said seal rings are mounted to be gas-tight, and means are provided for introducing gas under pressure to the space between said inner and outer tubes for monitoring the integrity of the seals between said mating seal ring surfaces.

11. A remote control master-slave manipulator adapted for operation through a barrier wall separating differing environments, said manipulator comprising a tubular support extending through an opening in a barrier wall, mechanical sealing means on the outside of said tubular support to seal said support in said opening, said tubular support including a closed wall separating the environments, a pivoted master arm assembly positioned on the operator's side of said barrier wall supported by said tubular support, a pivoted slave arm assembly positioned on the other side of said barrier wall supported by the other end of said tubular support, said master arm assembly and said slave arm assembly being pivoted on independent axes which are perpendicular to the longitudinal axis of said tubular support, a plurality of rotary mechanical seals extending through the closed wall of said tubular support and interconnecting the master and slave arm assemblies, said rotary mechanical seals having spaced apart and independent axes, one end of each of said rotary mechanical seals being responsive to manipulator motions of the master arm, said rotary mechanical seals being adapted to transmit said motions to the opposite end of said rotary mechanical seals, manipulator movements in the slave arm being responsive to rotation of said rotary mechanical seals.

12. A remote control master-slave manipulator according to claim 11 further characterized in that said support includes a seal tube assembly having an outer stationary tube and an inner tube rotatable therewith, at least one pair of mating seal ring surfaces within said tubular support, one of said seal ring surfaces being integral with a seal ring surrounding said inner tube and resiliently supported for limited movement in a longitudinal direction along the axis of said tubular support, the other of said mating seal ring surfaces being integral with a seal ring surrounding said inner tube and fixed against movement in a longitudinal direction along the axis of said tubular support, one of said seal ring surfaces being rotatable with said inner tube and the other of said seal ring surfaces being stationary with said outer tube.

13. A remote control master-slave manipulator according to claim 12 further characterized in that said seal tube assembly includes an outer tube adapted to be made stationary with respect to the barrier wall through which it extends, an inner tube extending through said outer tube and journaled for rotation relative thereto, at least one pair of mating seal ring surfaces within said seal tube assembly, one of said seal ring surfaces being integral with a seal ring surrounding said inner tube and resilient supported for limited movement in a longitudinal direction along the axis of said tube, the other of said mating seal ring surfaces being integral with a seal ring surrounding said inner tube and fixed stationary against longitudinal movement, one of said seal ring surfaces being mounted for rotation with said inner tube, the other of said mating seal ring surfaces being stationary against rotation.

14. A remote control master-slave manipulator according to claim 11 further characterized in that each of said rotary master and slave shafts at the ends opposite from the coupling means is provided with drum means, and each of said drum means is associated with linear movement transmission means, whereby linear motion is converted to rotary motion on one side of said rotary mechanical seal and reconverted to linear motion at the other side thereof.

15. A remote control master-slave manipulator according to claim 14 further characterized in that each of said drum means is associated with a pair of opposed linear movement transmission means each extending about the periphery of the drum in an opposite direction, a pivot pulley bank associated with each of the pivots of said master arm and slave arm assemblies, each of said pivot pulley banks including a plurality of double grooved pulleys, one of said pair of linear movement transmission means associated with one of said drum means extending around one groove of a pulley in one direction and the other of said linear movement transmission means associated with said same drum means extending about the other groove of said same pulley in the opposite direction, whereby variations in tension of said linear movement transmission means due to movement of said master and slave arm assemblies on their pivots may be compensated.

16. A remote control master-slave manipulator according to claim 14 further characterized in that said master, transfer and slave shafts are axially aligned, each of said drum means is provided with a radially toothed face gear coupling means and each end of each of said transfer shafts is provided with a mating radially toothed face gear, said face gears associated with said master and slave shafts being resiliently mounted for mating engagement with said transfer shaft face gears.

17. A remote control master-slave manipulator according to claim 11 further characterized in that each of said rotary mechanical seals comprises a housing, a shaft journaled in said housing for rotation relative thereto, at least one pair of mating seal ring surfaces enclosed within the housing, one of said seal ring surfaces being integral with a seal ring surrounding said shaft and resiliently supported for limited movement in the direction of the axis of said shaft, the other of said mating seal ring surfaces being integral with a seal ring surrounding said shaft and fixed against movement relative to said shaft in a direction along the longitudinal axis thereof, and means for rotating one of said mating seal ring surfaces with said shaft relative to the other mating seal ring surface.

18. A remote control master-slave manipulator according to claim 17 further characterized in that each of said rotary mechanical seals includes two pair of mating seal ring surfaces, said seal rings are gas tight, and means are provided for introducing gas under pressure to said mechanical seal housing in the space between said housing wall and said seal ring surfaces for monitoring the integrity of the seals between said mating seal ring surfaces.

19. A remote control master-slave manipulator adapted for operation through a barrier wall separating differing environments, said manipulator comprising a tubular support extending through an opening in a barrier wall, mechanical sealing means on the outside of said tubular support to seal said support in said opening, one end of said tubular support being open and in communication with one side of said barrier wall, the other end of said support extending into the space on the opposite side of the barrier wall, that end of the support being closed, the closed end of said support being provided with a plurality of sealed transfer shafts, each of said transfer shafts extending through the closed end of said support and each journaled for rotation therein, coupling means on the opposite ends of said shafts; a master arm assembly supported on the operator's side of said barrier wall, said master arm assembly including a generally tubular portion pivotally connected at one end to another portion supported by one of said tubular support, the free end of that portion of the master arm assembly being provided with a plurality of rotary master shafts each adapted for rotation therein, coupling means on each of said master shafts coupled with the coupling means of one of said transfer shafts, means adapted to rotate said rotary master shafts responsive to movements of the master arm; a slave arm assembly supported on the opposite side of said barrier wall, said slave arm assembly including a normally generally tubular portion pivotally connected at one end to another portion supported by the other end of said tubular support, that portion of said slave arm assembly being provided with a plurality of rotary slave shafts each adapted for rotation therein, coupling means on each of said slave shafts coupled with the coupling means of one of said transfer shafts and means connected to said rotary slave shafts adapted to produce movement in the slave arm responsive to rotation of said slave shafts.

20. A remote control manipulator adapted for operation through a barrier wall separating differeing environments, said manipulator comprising a horizontal tubular support adapted to be inserted through an opening in a barrier wall, mechanical sealing means on the outside of said tubular support to seal said support in an opening in a barrier wall, one end of said tubular support being open and adapted to be in communication with the operator's side of a barrier wall, the other end of said support adapted to extend into the space on the opposite side of the barrier wall being closed, the closed end of said support being provided with a plurality of sealed transfer shafts each extending through the closed end of said support and journaled for rotation on an axis perpendicular to the longitudinal axis of said support, coupling means on the opposite ends of said shafts; a master arm assembly adapted to be supported on the operator's side of a barrier wall, said master arm assembly including a generally vertical tubular portion pivotally connected at its upper end to a generally horizontal portion which is adapted to be inserted in and supported by said tubular support, the free end of the horizontal portion of the master arm assembly being provided with a plurality of rotary master shafts each adapted for rotation on an axis perpendicular to the longitudinal axis of said support, coupling means on each of said master shafts adapted to couple with the coupling means of one of said transfer shafts, means adapted to rotate said rotary master shafts responsive to movements of the master arm; a slave arm assembly adapted to be supported on the opposite side of a barrier wall, said slave arm assembly including a generally vertical tubular portion pivotally connected at its upper end to a generally horizontal portion which is adapted to rest upon and be supported by the closed end of said tubular support, the horizontal portion of the slave arm assembly being provided with a plurality of rotary slave shafts each adapted for rotation on an axis perpendicular to the longitudinal axis of said support, coupling means in each of said slave shafts adapted to couple with the coupling means of one of said transfer shafts, and means connected to said rotary slave shafts adapted to produce movements in the slave arm responsive to rotation of said slave shafts.

21. A remote control master-slave manipulator adapted for operation through a generally vertical barrier wall separating differing environments, said manipulator comprising a horizontal tubular seal tube support assembly extending through an opening in a barrier wall, said seal tube assembly including an outer tube and an inner tube, mechanical sealing means on the outside of said outer tube to seal said seal tube assembly and hold it stationary in said opening, said inner tube being journaled for rotation relative to said outer tube, at least one pair of mating annular seal ring surfaces within said seal tube assembly, one of said seal ring surfaces being mounted for rotation with said inner tube, the other of said mating seal ring surfaces being stationary against rotation, one of said mating seal ring surfaces being resiliently mounted for limited movement in a longitudinal direction along the axis of said tubes by a gas tight bellows surrounding said inner tube, the other of said pairs of mating seal ring surfaces being stationary against longitudinal movement, one end of said inner tube being open and in communication with the operator's side of said barrier wall, the other end of said inner tube being closed and extending into the space on the opposite side of the barrier wall, the closed end of said inner tube of the seal tube assembly being provided with a plurality of rotary mechanical seals extending through the wall at the closed end of the seal tube assembly and into the space on opposite sides thereof, each of said mechanical seals comprising a housing, a motion transfer shaft extending through said housing and journaled for rotation on an axis perpendicular to the longitudinal axis of the seal tube assembly, at least one pair of mating seal ring surfaces, one of said seal ring surfaces being mounted for rotation with said transfer shaft, the other of said mating seal ring surfaces being stationary against rotation, one of said mating seal ring surfaces being resiliently mounted for limited movement in a longitudinal direction along the axis of said transfer shaft by a gas tight bellows surrounding said shaft, the other of said mating seal ring surfaces being stationary against longitudinal movement, radially toothed face gear coupling means on the opposite ends of said transfer shaft, the axes of the shafts of each of said plurality of mechanical seals being parallel to one another; a master arm assembly supported on the operator's side of said barrier wall, said master arm assembly including a normally generally vertical tubular portion pivotally connected at its upper end to a generally horizontal portion inserted in and supported by said seal tube assembly, the free end of the horizontal portion of the master arm assembly being provided with a plurality of rotary master shafts corresponding in number to the number of said mechanical seals and each adapted for rotation on an axis aligned with the axis of the transfer shaft of one of said mechanical seals, drum means on each of said master shafts, radially toothed face gear coupling means associated with said drum means, said face gears being resiliently mounted for mating engagement with the face gears on the end of the mechanical seal transfer shafts within the inner tube of the seal tube assembly, linear motion transmission means attached to said drums extending through said seal tube assembly to the generally vertical tubular portion of the master arm assembly, said linear motion transmission means being movable in response to the operator's manipulation of the master arm assembly, said linear motion being convertible to rotary motion by said drum means; a slave arm assembly supported on the opposite side of said barrier wall, said slave arm assembly including a normally generally vertical tubular portion pivotally connected at its upper end to a generally horizontal portion resting upon and supported by the closed end of the inner tube of said seal tube assembly, the horizontal portion of said slave arm assembly being provided with a plurality of rotary slave shafts corresponding in number to said mechanical seals and each adapted for rotation on an axis aligned with the axis of a transfer shaft of said mechanical seal, drum means on each of said slave shafts, radially toothed face gear coupling means associated with each of said drum means, said face gears being resiliently mounted for mating engagement with the face gears on the opposite ends of said transfer shafts, linear motion transmission means associated with said slave drum means, said linear motion transmission means extending to the generally vertical tubular portion of said slave arm assembly for production of movement wherein, rotary movement of said slave drum resulting in linear motion of said linear motion transmission means for movement in the slave arm assembly responsive to rotation of said slave shafts.

22. A remote control master-slave manipulator according to claim 21 further characterized in that each of said rotary seals includes two pair of mating seal ring surfaces and means are provided for the introduction of gas under pressure to the space between the inner and outer tubular walls of said seal tube assembly and to the space between the housing wall and the bellows of each of said mechanical seals for the purpose of monitoring the integrity of the rotary seals formed by each of said pairs of mating seal ring surfaces.

23. A remote control master-slave manipulator according to claim 21 further characterized in that each of said drum means is associated with a pair of opposed linear movement transmission means each extending about the periphery of the drum in an opposite direction, a pivot pulley bank associated with each of the pivots of said master arm and slave arm assemblies, each of said pivot pulley banks including a plurality of double grooved pulleys, one of said pair of linear movement transmission means associated with one of said drum means extending around one groove of a pulley in one direction and the other of said linear movement transmission means associated with said same drum means extending about the other groove of said same pulley in the opposite direction, whereby variations in tension of said linear movement transmission means due to movement of said master and slave arm assemblies on their pivots may be compensated.

24. A remote control master-slave manipulator according to claim 21 further characterized in that said master arm assembly and said slave arm assembly each includes a pivotally supported trunk tube portion and a boom tube portion movable telescopically therein, a half-speed carriage assembly supported within each of said trunk tubes for movement therein in the same direction as and at one half the speed of movement of said boom tubes, said half-speed carriage assembly including a pulley bank comprised of a plurality of pulleys, said linear motion transmission means extending over the pulleys of said pulley bank in their path of travel between said drums and manipulator mechanisms at the free ends of said boom tubes, and other linear motion transmission means connecting said half-speed carriage to counterbalance means.

25. In a remote control master-slave manipulator adapted for operation through a barrier wall and including a pivoted master arm assembly adapted to be positioned on one side of a barrier wall, a pivoted slave arm assembly adapted to be positioned on the other side of the barrier wall, a tubular support adapted to extend through the barrier wall between the master and slave assemblies, said master arm and slave arm assemblies each including a pivotally supported trunk tube portion and a boom tube portion telescopically movable therein, a plurality of linear motion transmission means operatively connected through said tubular support to transmit manipulator motions of said master arm assembly to said slave arm assembly, a half-speed carriage assembly supported within each of said trunk tubes for movement therein in the same direction as and at one half the speed of movement of said boom tubes, said half-speed carriage assembly including a pulley bank comprised of a plurality of pulleys, said linear motion transmission means extending over the pulleys of said pulley bank in their paths of travel between the tubular support and manipulator mechanisms at the free ends of said boom tubes, counterbalance means suspended outside of each of said trunk tubes for movement therealong, and other linear motion transmission means extending between said half-speed carriage and counterbalance means.

References Cited by the Examiner
UNITED STATES PATENTS

| | | | |
|---|---|---|---|
| 2,175,868 | 10/39 | Bently | 277—2 |
| 2,764,301 | 9/56 | Goertz et al. | |
| 2,842,969 | 7/58 | Baker | 74—18 |
| 2,888,154 | 5/59 | Jelatis et al. | |
| 2,933,141 | 4/60 | Kapsenberg | 74—18 |

OTHER REFERENCES

Supplement to the Proceedings, April 1959, of the Seventh Hot Laboratories and Equipment Conference (paper presented by P. Pesenti and G. Cherel-French, Master Slaves).

HUGO O. SCHULZ, *Primary Examiner.*

BROUGHTON G. DURHAM, ERNEST A. FALLER,
*Examiners.*